US012637577B2

(12) United States Patent (10) Patent No.: US 12,637,577 B2
Yoshida (45) Date of Patent: May 26, 2026

(54) DISPERSION OF METAL FINE PARTICLES

(71) Applicant: KAO CORPORATION, Tokyo (JP)

(72) Inventor: Tomohide Yoshida, Wakayama (JP)

(73) Assignee: KAO CORPORATION, Tokyo (JP)

( * ) Notice: Subject to any disclaimer, the term of this patent is extended or adjusted under 35 U.S.C. 154(b) by 996 days.

(21) Appl. No.: 17/417,510

(22) PCT Filed: Apr. 26, 2019

(86) PCT No.: PCT/JP2019/018019
§ 371 (c)(1),
(2) Date: Mar. 10, 2022

(87) PCT Pub. No.: WO2020/136934
PCT Pub. Date: Jul. 2, 2020

(65) Prior Publication Data
US 2022/0204798 A1 Jun. 30, 2022

(30) Foreign Application Priority Data

Dec. 27, 2018 (JP) ................................. 2018-245002

(51) Int. Cl.
| | |
|---|---|
| *C09D 11/322* | (2014.01) |
| *B22F 1/00* | (2022.01) |
| *B22F 1/0545* | (2022.01) |
| *B22F 1/102* | (2022.01) |
| *B22F 1/107* | (2022.01) |
| *B41M 1/22* | (2006.01) |
| *B41M 5/00* | (2006.01) |
| *C08K 3/08* | (2006.01) |
| *C08K 5/053* | (2006.01) |
| *C08K 5/07* | (2006.01) |
| *C08K 5/09* | (2006.01) |
| *C08L 101/08* | (2006.01) |
| *C09D 11/033* | (2014.01) |
| *C09D 11/037* | (2014.01) |
| *C09D 11/106* | (2014.01) |
| *C09D 11/30* | (2014.01) |
| *C09D 11/36* | (2014.01) |
| *C09D 11/38* | (2014.01) |
| *C09D 11/52* | (2014.01) |
| *C09D 17/00* | (2006.01) |
| *H01B 1/22* | (2006.01) |
| *H01Q 1/22* | (2006.01) |
| *H01G 4/008* | (2006.01) |
| *H01G 4/30* | (2006.01) |

(52) U.S. Cl.
CPC .............. *C09D 11/322* (2013.01); *B22F 1/00* (2013.01); *B22F 1/0545* (2022.01); *B22F 1/102* (2022.01); *B22F 1/107* (2022.01); *B41M 1/22* (2013.01); *B41M 5/0023*

(2013.01); *C08K 3/08* (2013.01); *C08K 5/053* (2013.01); *C08K 5/07* (2013.01); *C08K 5/09* (2013.01); *C08L 101/08* (2013.01); *C09D 11/033* (2013.01); *C09D 11/037* (2013.01); *C09D 11/106* (2013.01); *C09D 11/30* (2013.01); *C09D 11/36* (2013.01); *C09D 11/38* (2013.01); *C09D 11/52* (2013.01); *C09D 17/002* (2013.01); *C09D 17/006* (2013.01); *H01B 1/22* (2013.01); *H01Q 1/2225* (2013.01); *H01G 4/008* (2013.01); *H01G 4/30* (2013.01)

(58) Field of Classification Search
None
See application file for complete search history.

(56) References Cited

U.S. PATENT DOCUMENTS

| | | | |
|---|---|---|---|
| 2012/0219703 A1* | 8/2012 | Son ........................... | C09D 5/24 427/123 |
| 2013/0079581 A1 | 3/2013 | Rode et al. | |
| 2013/0095320 A1 | 4/2013 | Sano et al. | |
| 2014/0238833 A1 | 8/2014 | Virkar et al. | |
| 2015/0037550 A1 | 2/2015 | Balasubramaniam et al. | |
| 2016/0137855 A1 | 5/2016 | Tsuyama et al. | |
| 2021/0379654 A1 | 12/2021 | Yoshida et al. | |

FOREIGN PATENT DOCUMENTS

| | | | |
|---|---|---|---|
| CN | 105358640 A | | 2/2016 |
| EP | 2 551 039 A1 | | 1/2013 |
| EP | 3 865 230 A1 | | 8/2021 |
| JP | 2009-74171 A | | 4/2009 |
| JP | 2010-176976 A | | 8/2010 |
| JP | 2010-209366 A | | 9/2010 |
| JP | 2013-69475 A | | 4/2013 |
| JP | 2013-82967 A | | 5/2013 |
| JP | 2013082967 A | * | 5/2013 |

(Continued)

OTHER PUBLICATIONS

English machine translation of Fujiwara et al. (JP-2013082967-A) accessed online from Espacenet; a PDF copy, pp. 1-18, is attached to the case file. (Year: 2013).*

(Continued)

*Primary Examiner* — Katie L. Hammer
(74) *Attorney, Agent, or Firm* — Oblon, McClelland, Maier & Neustadt, L.L.P.

(57) ABSTRACT

The present invention relates to [1] a dispersion of metal fine particles containing hydroxyacetone and propylene glycol, in which a cumulant average particle size of the metal fine particles is not less than 0.01 µm and not more than 0.1 µm, and [2] an ink containing the dispersion of metal fine particles as described in the above [1].

13 Claims, No Drawings

(56) References Cited

FOREIGN PATENT DOCUMENTS

| JP | 2014-88603 A | 5/2014 |
|----|--------------|---------|
| JP | 2014-107484 A | 6/2014 |
| JP | 2014-127337 A | 7/2014 |
| JP | 2014-194070 A | 10/2014 |
| JP | 2015-112691 A | 6/2015 |
| JP | 2017-2219 A | 1/2017 |
| TW | 200301154 A | 7/2003 |
| WO | WO 2012/171936 A1 | 12/2012 |
| WO | WO 2014/133890 A2 | 9/2014 |
| WO | WO 2014/133890 A3 | 9/2014 |

OTHER PUBLICATIONS

English text machine translation of Hara et al. (JP 2010-176976 A) accessed online from Espacenet, PDF pp. 1-60. (Year: 2010).*

International Search Report issued on Jun. 4, 2019 in PCT/JP2019/018019 filed on Apr. 26, 2019, 2 pages.

Extended European Search report issued Sep. 21, 2022 in European Patent Application No. 19902581.8, 10 pages.

* cited by examiner

DISPERSION OF METAL FINE PARTICLES

FIELD OF THE INVENTION

The present invention relates to a dispersion of metal fine particles and an ink containing the dispersion of metal fine particles.

BACKGROUND OF THE INVENTION

Metal fine particles obtained by atomizing a metal into fine particles having a nano-order size are capable of exhibiting a variety of functions and properties upon use thereof, and it has been therefore expected that the metal fine particles are used in a wide variety of industrial applications.

In order to promote use of the metal fine particles in the industrial applications, dispersions of various metal fine particles have been conventionally studied. For example, as a chemical method for producing metal atoms (fine particles), there are known wet methods such as a method in which metal ions eluted from a metal compound are subjected to reduction reaction in a liquid, a method in which a metal atom is retrieved from a metal complex by thermal decomposition of the metal complex, and the like. However, in the method using the metal complex, it has been required to conduct the heat treatment under high-temperature conditions, and a reducing liquid used for reducing the metal complex poses the problem concerning removal of residual organic substances, etc. For this reason, studies have been conventionally made to provide a dispersion of metal fine particles which has high industrial practicality.

For example, JP 2013-69475A (Patent Literature 1) aims at providing a conductive paste that can be inhibited from suffering from occurrence of bumping when subjected to heating or sintering, etc., and discloses a conductive paste containing metal fine particles (P) and a dispersing medium (D) whose content ratio (P/D) (% by mass) is 50 to 90/50 to 10, in which the dispersing medium (D) is an organic dispersing medium (D1) constituted of an organic solvent (S) and an anti-bumping solvent (T), the organic solvent (S) is an organic solvent (S1) constituted of a predetermined alcohol and/or a predetermined polyhydric alcohol, or an organic solvent (S2) constituted of the organic solvent (81) and an amide group-containing organic solvent (SA), the anti-bumping solvent (T) is a predetermined compound containing a hydroxy group and a carbonyl group, and a ratio of the anti-bumping solvent (T) to the organic dispersing medium (D1) (T/D1) is 2 to 25% by mass.

JP 2010-209366A (Patent Literature 2) aims at providing a process for producing metal nanoparticles capable of exhibiting low-temperature sintering properties which can be used as a conductive material, from easily reducible metal ions such as noble metal ions, even when using a reducing agent having a strong reducing power, and discloses a process for producing metal nanoparticles which includes the step of mixing a mixture containing a metal colloid protective agent (1) and a metal compound and a mixture containing a metal colloid protective agent (2) and a reducing agent.

SUMMARY OF THE INVENTION

The present invention relates to a dispersion of metal fine particles containing hydroxyacetone and propylene glycol, in which a cumulant average particle size of the metal fine particles is not less than 0.01 μm and not more than 0.1 μm.

DETAILED DESCRIPTION OF THE INVENTION

Since the functions and properties of the metal fine particles tend to largely vary depending upon a particle size thereof, coarse metal fine particles having a particle size of more than 0.1 μm if included therein tend to cause deterioration in the functions and properties of the metal fine particles. In addition, as the particle size of the metal fine particles is increased, the velocity of precipitation of the metal fine particles becomes larger, so that the metal fine particles tend to be deteriorated in dispersion stability. As a result, it is not possible to obtain metal fine particles having sufficient storage stability. On the other hand, the metal fine particles having a smaller particle size tend to cause increase in energy in a dispersion system thereof, so that a dispersing state of the metal fine particles in the dispersion tends to be unstable. In the technology described in the Patent Literature 1, the metal fine particles have a large particle size, whereas in the technology described in the Patent Literature 2, the metal fine particles tend to be insufficient in dispersion stability. For this reason, in the technologies described in these Patent Literatures, it is not possible to ensure good storage stability of the dispersion of the metal fine particles when storing the dispersion of the metal fine particles under high-temperature conditions for a long period of time.

The present invention relates to a dispersion of metal fine particles having a cumulant average particle size of not more than 0.1 μm, which is excellent in storage stability under high-temperature conditions, and an ink containing the dispersion of the metal fine particles.

The present inventors have noticed that by incorporating hydroxyacetone and propylene glycol into the dispersion of the metal fine particles, it is possible to improve dispersion stability of the metal fine particles in the dispersion, and the present inventors have found that the dispersion of the metal fine particles which contains the hydroxyacetone and propylene glycol is excellent in storage stability under high-temperature conditions even in the case where a cumulant average particle size of the metal fine particles is not more than 0.1 μm.

That is, the present invention relates to the following aspects [1] to [6].

[1] A dispersion of metal fine particles containing hydroxyacetone and propylene glycol, in which a cumulant average particle size of the metal fine particles is not less than 0.01 μm and not more than 0.1 μm.

[2] An ink containing the dispersion of metal fine particles according to the above aspect [1].

[3] A method for producing a printed material, including the step of applying the ink according to the above aspect [2] onto a printing medium to obtain the printed material on which a metal film is formed.

[4] An antenna for RFID tag, which is formed from the ink according to the above aspect [2].

[5] An RFID tag including the antenna for RFID tag according to the above aspect [4].

[6] A multi-layer ceramic capacitor including an internal electrode layer that is produced from the ink according to the above aspect [2].

In accordance with the present invention, it is possible to provide a dispersion of metal fine particles having a cumulant average particle size of not more than 0.1 μm, which is excellent in storage stability under high-temperature conditions, and an ink containing the dispersion of metal fine particles.

[Metal Fine Particle Dispersion]

The dispersion of metal fine particles according to the present invention (hereinafter also referred to merely as a "metal fine particle dispersion" or a "dispersion") contains hydroxyacetone and propylene glycol, in which a cumulant average particle size of the metal fine particles is not less than 0.01 μm and not more than 0.1 μm.

In the metal fine particle dispersion of the present invention, the metal fine particles are dispersed in a medium containing hydroxyacetone and propylene glycol.

According to the present invention, it is possible to obtain the metal fine particle dispersion that contains the metal fine particles having a cumulant average particle size of not more than 0.1 μm, and is excellent in storage stability under high-temperature conditions (hereinafter also referred to merely as "storage stability"). The reason why the aforementioned advantageous effects can be attained by the present invention is considered as follows, though it is not clearly determined yet.

That is, the metal fine particle dispersion of the present invention contains the hydroxyacetone and propylene glycol, in which the hydroxyacetone contains a carbonyl group and a hydroxy group in a molecule thereof, and the propylene glycol contains two hydroxy groups in a molecule thereof. It is therefore considered that since the hydroxyacetone and the propylene glycol are coordinated and adsorbed onto the metal fine particles through these functional groups, the metal fine particles can be improved in dispersion stability owing to the chelating effect. In addition, it is considered that the hydroxyacetone and the propylene glycol exhibit a low steric hindrance owing to their low molecular weights, and therefore can be closely coordinated and adsorbed onto the surface of the respective metal fine particles. Moreover, the hydroxyacetone (monohydroxyacetone) contains a hydrophobic methyl group and a hydrophilic hydroxymethyl group which are respectively bonded to opposite sides of the carbonyl group, and therefore is excellent in balance between hydrophilic and hydrophobic properties. For this reason, it is considered that even when storing the metal fine particle dispersion under high-temperature conditions which tend to usually cause deterioration in dispersion stability of the metal fine particles therein, the hydroxyacetone is hardly desorbed from the surface of the respective metal fine particles, so that it is possible to improve dispersion stability of the metal fine particles in the dispersion. As a result, it is considered that even under severe high-temperature storage conditions, it is possible to obtain a metal fine particle dispersion that is excellent in storage stability.

<Metal Fine Particles>

Examples of the metal (metal atom) constituting the metal fine particles according to the present invention include Group 4 transition metals such as titanium, zirconium, etc.; Group 5 transition metals such as vanadium, niobium, etc.; Group 6 transition metals such as chromium, molybdenum, tungsten, etc.; Group 7 transition metals such as manganese, technetium, rhenium, etc.; Group 8 transition metals such as iron, ruthenium, etc.; Group 9 transition metals such as cobalt, rhodium, iridium, etc.; Group 10 transition metals such as nickel, palladium, platinum, etc.; Group 11 transition metals such as copper, silver, gold, etc.; Group 12 transition metals such as zinc, cadmium, etc.; Group 13 transition metals such as aluminum, gallium, indium, etc.; Group 14 transition metals such as germanium, tin, lead, etc.; and the like. As the metal constituting the metal fine particles, one kind of metal may be used alone as a single metal, or two or more kinds of metals may be used in combination with each other in the form of an alloy. Among these metals, preferred are those transition metals belonging to Groups 4 to 11 in the 4th to 6th Periods of the Periodic Table, more preferred are copper, and noble metals such as gold, silver, platinum, palladium, etc., even more preferred is at least one metal selected from the group consisting of gold, silver, copper and palladium, further even more preferred is at least one metal selected from the group consisting of gold, silver and copper, and still further even more preferred is silver. The kinds of metals may be determined by inductively coupled plasma atomic emission spectroscopy.

The cumulant average particle size of the metal fine particles contained in the metal fine particle dispersion is not less than 0.01 μm, preferably not less than 0.015 μm, more preferably not less than 0.017 μm and even more preferably not less than 0.02 μm from the viewpoint of improving dispersion stability of the metal fine particles and storage stability of the resulting dispersion, and is also not more than 0.1 μm, preferably not more than 0.08 μm, more preferably not more than 0.06 μm and even more preferably not more than 0.04 μm from the viewpoint of finely atomizing the metal fine particles. The cumulant average particle size may be measured by the method described in Examples below.

<Dispersant B>

In the present invention, it is preferred that the metal fine particles are dispersed in the dispersion with a dispersant B. The dispersant B is not particularly limited as long as it is a substance having a function capable of dispersing the metal fine particles, such as a surfactant, a polymer, etc.

From the viewpoint of improving dispersion stability of the metal fine particles and storage stability of the resulting dispersion, it is preferred that the metal fine particles are dispersed in the dispersion with a polymer (b) as the dispersant B. The polymer (b) is preferably in the form of a polymer that contains a hydrophilic group, and it is more preferred that the polymer (b) contains the hydrophilic group on a side chain thereof.

Examples of the hydrophilic group include anionic groups, e.g., groups that are capable of releasing hydrogen ions upon dissociation thereof to allow the polymer to exhibit acidity, such as a carboxy group (—COOM), a sulfonic acid group (—SO$_3$M), a phosphoric acid group (—OPO$_3$M$_2$), etc., or dissociated ion forms of these groups (such as —COO$^-$, —SO$_3^-$, —OPO$_3^{2-}$ and —OPO$_3^-$M), etc.; nonionic groups such as a hydroxy group, an amide group, an oxyalkylene group, etc.; cationic groups such as protonic acid salts of a primary, secondary or tertiary amino group, a quaternary ammonium group, etc.; and the like. In the aforementioned chemical formulae, M represents a hydrogen atom, an alkali metal, ammonium or an organic ammonium.

From the viewpoint of improving dispersion stability of the metal fine particles and storage stability of the resulting dispersion, as the polymer (b), preferred are a nonionic group-containing polymer and an anionic group-containing polymer, and more preferred is an anionic group-containing polymer.

Examples of the nonionic polymer include a polymer having a structure derived from vinyl pyrrolidone, such as polyvinyl pyrrolidone, etc., a polymer having a structure derived from acrylamide, such as polyacrylamide, etc., polyvinyl alcohol, a polymer containing a polyethyleneoxide chain, and the like.

The anionic group-containing polymer is preferably in the form of a carboxy group-containing polymer. As the basic structure of the carboxy group-containing polymer, there may be mentioned a condensation-based polymer such as a polyester, a polyurethane, etc.; a vinyl-based polymer such as an acrylic resin, a styrene-based resin, a styrene-acrylic resin, an acrylic silicone-based resin, etc.; and the like.

The polymer (b) preferably contains a carboxy group on a side chain thereof from the viewpoint of improving dispersion stability of the metal fine particles and storage stability of the resulting dispersion. The carboxy group contained in the polymer (b) is preferably introduced into a polymer skeleton thereof by a carboxy group-containing monomer (b-1). That is, the polymer (b) preferably contains a constitutional unit derived from the carboxy group-containing monomer (b-1). Among these polymers, from the viewpoint of improving dispersion stability of the metal fine particles and storage stability of the resulting dispersion, preferred is a vinyl-based polymer that contains the constitutional unit derived from the carboxy group-containing monomer (b-1), a constitutional unit derived from a hydrophobic monomer (b-2) and a constitutional unit derived from a polyalkylene glycol segment-containing monomer (b-3). The polymer (b) may be produced by copolymerizing a raw material monomer containing the monomer (b-1), the monomer (b-2) and the monomer (b-3). The polymer (b) may be in the form of any of a block copolymer, a random copolymer and an alternating copolymer.

[Carboxy Group-Containing Monomer (b-1)]

The carboxy group contained in the monomer (b-1) is the same as described above.

Specific examples of the monomer (b-1) include unsaturated monocarboxylic acids such as (meth)acrylic acid, crotonic acid, 2-methacryloyloxymethylsuccinic acid, etc.; unsaturated dicarboxylic acids such as maleic acid, itaconic acid, fumaric acid, citraconic acid, etc.; and the like. Incidentally, the aforementioned unsaturated dicarboxylic acids may be in the form of an anhydride thereof.

These monomers (b-1) may be used alone or in combination of any two or more thereof.

The monomer (b-1) is preferably at least one monomer selected from the group consisting of (meth)acrylic acid and maleic acid from the viewpoint of improving dispersion stability of the metal fine particles and storage stability of the resulting dispersion.

The term "(meth)acrylic acid" as used in the present invention means at least one compound selected from the group consisting of acrylic acid and methacrylic acid, and the "(meth)acrylic acid" is hereinlater also defined in the same way.

[Hydrophobic Monomer (b-2)]

The monomer (b-2) is preferably used as a monomer component of the polymer (b) from the viewpoint of improving dispersion stability of the metal fine particles and storage stability of the resulting dispersion.

The term "hydrophobic" of the hydrophobic monomer as used in the present invention means that a solubility in water of the monomer as measured by dissolving the monomer in 100 g of ion-exchanged water at 25° C. until reaching a saturation concentration thereof is less than 10 g. The solubility in water of the monomer (b-2) is preferably not more than 5 g and more preferably not more than 1 g from the viewpoint of improving dispersion stability of the metal fine particles and storage stability of the resulting dispersion.

The monomer (b-2) is preferably at least one monomer selected from the group consisting of an aromatic group-containing monomer and a (meth)acrylate containing a hydrocarbon group derived from an aliphatic alcohol.

The term "(meth)acrylate" as used in the present invention means at least one compound selected from the group consisting of an acrylate and a methacrylate, and the "(meth) acrylate" is hereinafter also defined in the same way.

The aromatic group-containing monomer is preferably a vinyl monomer containing an aromatic group having not less than 6 and not more than 22 carbon atoms which may contain a substituent group containing a hetero atom, and more preferably at least one monomer selected from the group consisting of a styrene-based monomer and an aromatic group-containing (meth)acrylate. The molecular weight of the aromatic group-containing monomer is preferably less than 500.

Examples of the styrene-based monomer include styrene, α-methyl styrene, 2-methyl styrene, 4-vinyl toluene (4-methyl styrene), divinyl benzene and the like. Among these styrene-based monomers, preferred are styrene and α-methyl styrene.

As the aromatic group-containing (meth)acrylate, preferred are phenyl (meth)acrylate, benzyl (meth)acrylate, phenoxyethyl (meth)acrylate, etc., and more preferred is benzyl (meth)acrylate.

As the (meth)acrylate containing a hydrocarbon group derived from an aliphatic alcohol, preferred are those (meth) acrylates containing a hydrocarbon group derived from an aliphatic alcohol having not less than 1 and not more than 22 carbon atoms. Examples of the (meth)acrylates containing a hydrocarbon group derived from an aliphatic alcohol having not less than 1 and not more than 22 carbon atoms include (meth)acrylates containing a linear alkyl group, such as methyl (meth)acrylate, ethyl (meth)acrylate, propyl (meth) acrylate, butyl (meth)acrylate, pentyl (meth)acrylate, octyl (meth)acrylate, decyl (meth)acrylate, dodecyl (meth)acrylate, stearyl (meth)acrylate, etc.; (meth)acrylates containing a branched alkyl group, such as isopropyl (meth)acrylate, isobutyl (meth)acrylate, tert-butyl (meth)acrylate, isopentyl (meth)acrylate, isooctyl (meth)acrylate, isodecyl (meth) acrylate, isododecyl (meth)acrylate, isostearyl (meth)acrylate, 2-ethylhexyl (meth)acrylate, etc.; (meth)acrylates containing an alicyclic alkyl group, such as cyclohexyl (meth) acrylate, etc.; and the like. Of these (meth)acrylates, more preferred are those (meth)acrylates containing an alkyl group having not less than 6 and not more than 10 carbon atoms.

These monomers (b-2) may be used alone or in combination of any two or more thereof.

As the monomer (b-2), from the viewpoint of improving dispersion stability of the metal fine particles and storage stability of the resulting dispersion, preferred is the aromatic group-containing monomer, more preferred is the styrene-based monomer, even more preferred is at least one monomer selected from the group consisting of styrene, α-methyl styrene, 2-methyl styrene and 4-vinyl toluene (4-methyl styrene), and further even more preferred is at least one monomer selected from the group consisting of styrene and α-methyl styrene.

[Polyalkylene Glycol Segment-Containing Monomer (b-3)]

The monomer (b-3) is preferably used as a monomer component of the polymer (b) from the viewpoint of improving dispersion stability of the metal fine particles and storage stability of the resulting dispersion.

The monomer (b-3) is preferably a monomer that is capable of introducing a polyalkylene glycol segment into the polymer (b) as a side chain of the polymer (b) from the viewpoint of improving dispersion stability of the metal fine particles and storage stability of the resulting dispersion.

Examples of the monomer (b-3) include a polyalkylene glycol (meth)acrylate, an alkoxy polyalkylene glycol (meth) acrylate, a phenoxy alkylene glycol (meth)acrylate and the like. These monomers (b-3) may be used alone or in combination of any two or more thereof.

As the monomer (b-3), preferred is at least one monomer selected from the group consisting of a polyalkylene glycol (meth)acrylate and an alkoxy polyalkylene glycol (meth) acrylate, and more preferred is an alkoxy polyalkylene glycol (meth)acrylate. The number of carbon atoms in an alkoxy group of the alkoxy polyalkylene glycol (meth) acrylate is preferably not less than 1 and not more than 8, and more preferably not less than 1 and not more than 4.

Examples of the alkoxy polyalkylene glycol (meth)acrylate include methoxy polyalkylene glycol (meth)acrylates, ethoxy polyalkylene glycol (meth)acrylates, propoxy polyalkylene glycol (meth)acrylates, butoxy polyalkylene glycol (meth)acrylates, octoxy polyalkylene glycol (meth)acrylates and the like.

The polyalkylene glycol segment of the monomer (b-3) preferably contains a unit derived from an alkyleneoxide having not less than 2 and not more than 4 carbon atoms. Examples of the alkyleneoxide include ethyleneoxide, propyleneoxide, butyleneoxide and the like.

The number of the units derived from the alkyleneoxide in the aforementioned polyalkylene glycol segment is preferably not less than 2, more preferably not less than 5 and even more preferably not less than 10, and is also preferably not more than 100, more preferably not more than 70 and even more preferably not more than 50.

The aforementioned polyalkylene glycol segment is preferably a copolymer containing a unit derived from ethyleneoxide and a unit derived from propyleneoxide from the viewpoint of improving dispersion stability of the metal fine particles and storage stability of the resulting dispersion. The molar ratio of the ethyleneoxide unit (EO) to the propyleneoxide unit (PO) [EO/PO] is preferably not less than 60/40, more preferably not less than 65/35 and even more preferably not less than 70/30, and is also preferably not more than 90/10, more preferably not more than 85/15 and even more preferably not more than 80/20.

The copolymer containing the unit derived from ethyleneoxide and the unit derived from propyleneoxide may be in the form of any of a block copolymer, a random copolymer and an alternating copolymer.

Specific examples of commercially available products of the monomer (b-3) include "NK ESTER AM-90G", "NK ESTER AM-130G", "NK ESTER AMP-20GY", "NK ESTER AMP-230G", "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400", "BLEMMER PME-1000", "BLEMMER PME-4000" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like as products available from NOF Corporation.

(Contents of Respective Monomers in Raw Material Monomer or Contents of Respective Constitutional Units in Polymer (b))

The contents of the aforementioned monomers (b-1) to (b-3) in the raw material monomer (contents of non-neutralized components; hereinafter defined in the same way) upon production of the polymer (b), or the contents of the constitutional units derived from the monomers (b-1) to (b-3) in the polymer (b), are as follows, from the viewpoint of improving dispersion stability of the metal fine particles and storage stability of the resulting dispersion.

The content of the monomer (b-1) is preferably not less than 5 mol %, more preferably not less than 10 mol % and even more preferably not less than 15 mol %, and is also preferably not more than 40 mol %, more preferably not more than 35 mol % and even more preferably not more than 30 mol %.

The content of the monomer (b-2) is preferably not less than 50 mol %, more preferably not less than 60 mol % and even more preferably not less than 65 mol %, and is also preferably not more than 90 mol %, more preferably not more than 85 mol % and even more preferably not more than 80 mol %.

The content of the monomer (b-3) is preferably not less than 1 mol %, more preferably not less than 5 mol % and even more preferably not less than 7 mol %, and is also preferably not more than 30 mol %, more preferably not more than 20 mol % and even more preferably not more than 15 mol %.

The polymer (b) preferably contains a constitutional unit derived from (meth)acrylic acid or maleic acid as the monomer (b-1), a constitutional unit derived from a styrene-based monomer as the monomer (b-2) and a constitutional unit derived from an alkoxy polyalkylene glycol (meth)acrylate as the monomer (b-3).

As the polymer (b), there may be used either a synthesized product obtained by conventionally known methods or a commercially available product. Examples of the commercially available product of the polymer (b) include "DISPERBYK-190" and "DISPERBYK-2015" both available from BYK Chemie GmbH, and the like.

The number-average molecular weight of the polymer (b) is preferably not less than 1,000, more preferably not less than 2,000 and even more preferably not less than 3,000, and is also preferably not more than 100,000, more preferably not more than 50,000, even more preferably not more than 30,000, further even more preferably not more than 10,000 and still further even more preferably not more than 7,000. When the number-average molecular weight of the polymer (b) lies within the aforementioned range, adsorption of the polymer (b) onto the metal fine particles is sufficient, so that the metal fine particles can exhibit good dispersion stability in the dispersion. The number-average molecular weight may be measured by the method described in Examples below.

The acid value of the polymer (b) is preferably not less than 5 mgKOH/g, more preferably not less than 10 mgKOH/g and even more preferably not less than 15 mgKOH/g, and is also preferably not more than 200 mgKOH/g, more preferably not more than 100 mgKOH/g, even more preferably not more than 50 mgKOH/g and further even more preferably not more than 30 mgKOH/g.

The acid value of the polymer (b) may be measured by the method described in Examples below.

Examples of the configuration of the polymer (b) in the metal fine particle dispersion include the configuration in which the polymer (b) is adsorbed onto the respective metal fine particles, the configuration in which the metal fine particles are incorporated in the polymer (b), i.e., the metal fine particles are enclosed (encapsulated) in the polymer (b), and the configuration in which the polymer (b) is not adsorbed onto the respective metal fine particles. From the viewpoint of improving dispersion stability of the metal fine particles, among these configurations, preferred is the configuration in which the metal fine particles are incorporated in the polymer (b), and more preferred is the metal fine particle-enclosing configuration in which the metal fine particles are enclosed in the polymer (b).

The mass ratio of the polymer (b) to a sum of the polymer (b) and the metal [polymer (b)/(polymer (b)+metal)] in the metal fine particle dispersion is preferably not less than 0.01, more preferably not less than 0.03 and even more preferably not less than 0.05, and is also preferably not more than 0.3, more preferably not more than 0.2 and even more preferably not more than 0.15, from the viewpoint of improving dispersion stability of the metal fine particles and storage stability of the resulting dispersion.

The aforementioned mass ratio [polymer (b)/(polymer (b)+metal)] is calculated from masses of the polymer (b) and the metal which may be measured by the method described in Examples below using a differential thermogravimetric simultaneous measurement apparatus (TG/DTA).

<Hydroxyacetone>

The metal fine particle dispersion of the present invention contains hydroxyacetone from the viewpoint of improving dispersion stability of the metal fine particles and storage stability of the resulting dispersion.

The content of the hydroxyacetone in the metal fine particle dispersion is preferably not less than 0.05% by mass, more preferably not less than 0.1% by mass and even more preferably not less than 0.2% by mass, and is also preferably not more than 30% by mass, more preferably not more than 20% by mass, even more preferably not more than 10% by mass, further even more preferably not more than 5% by mass and still further even more preferably not more than 3% by mass, from the viewpoint of improving dispersion stability of the metal fine particles and storage stability of the resulting dispersion.

The mass ratio of the hydroxyacetone to the metal [hydroxyacetone/metal] in the metal fine particle dispersion is preferably not less than 0.005 and more preferably not less than 0.01, and is also preferably not more than 5, more preferably not more than 3, even more preferably not more than 2, further even more preferably not more than 1, still further even more preferably not more than 0.5 and furthermore preferably not more than 0.1, from the viewpoint of improving dispersion stability of the metal fine particles and storage stability of the resulting dispersion.

The content of the hydroxyacetone and the aforementioned mass ratio [hydroxyacetone/metal] in the metal fine particle dispersion may be measured and calculated by the methods described in Examples below.

<Propylene Glycol>

The metal fine particle dispersion of the present invention contains propylene glycol from the viewpoint of improving dispersion stability of the metal fine particles and storage stability of the resulting dispersion.

The content of the propylene glycol in the metal fine particle dispersion is preferably not less than 0.1% by mass and more preferably not less than 0.3% by mass, and is also preferably not more than 90% by mass, more preferably not more than 85% by mass, even more preferably not more than 80% by mass, further even more preferably not more than 75% by mass and still further even more preferably not more than 70% by mass, from the viewpoint of improving dispersion stability of the metal fine particles and storage stability of the resulting dispersion.

In the present invention, the propylene glycol may also be used as a dispersing medium for the metal fine particle dispersion. In this case, the content of the propylene glycol in the metal fine particle dispersion is preferably not less than 30% by mass, more preferably not less than 40% by mass and even more preferably not less than 50% by mass, and is also preferably not more than 90% by mass, more preferably not more than 80% by mass and even more preferably not more than 70% by mass, from the viewpoint of improving dispersion stability of the metal fine particles and storage stability of the resulting dispersion.

The mass ratio of the propylene glycol to the metal [propylene glycol/metal] in the metal fine particle dispersion is preferably not less than 0.01, more preferably not less than 0.02 and even more preferably not less than 0.05, and is also preferably not more than 20, more preferably not more than 10, even more preferably not more than 5, further even more preferably not more than 4 and still further even more preferably not more than 3, from the viewpoint of improving dispersion stability of the metal fine particles and storage stability of the resulting dispersion.

The total content of the hydroxyacetone and the propylene glycol in the metal fine particle dispersion is preferably not less than 0.1% by mass, more preferably not less than 0.5% by mass, even more preferably not less than 1% by mass, further even more preferably not less than 10% by mass, still further even more preferably not less than 30% by mass and furthermore preferably not less than 50% by mass, and is also preferably not more than 95% by mass, more preferably not more than 85% by mass, even more preferably not more than 80% by mass and further even more preferably not more than 75% by mass, from the viewpoint of improving dispersion stability of the metal fine particles and storage stability of the resulting dispersion.

The mass ratio of the hydroxyacetone to the propylene glycol [hydroxyacetone/propylene glycol] in the metal fine particle dispersion is preferably not less than 0.001, more preferably not less than 0.005, even more preferably not less than 0.01 and further even more preferably not less than 0.015, and is also preferably not more than 5.5, more preferably not more than 5, even more preferably not more than 4, further even more preferably not more than 3, still further even more preferably not more than 2 and furthermore preferably not more than 1, from the viewpoint of improving dispersion stability of the metal fine particles and storage stability of the resulting dispersion.

The content of the propylene glycol in the metal fine particle dispersion, the total content of the hydroxyacetone and the propylene glycol in the metal fine particle dispersion and the aforementioned respective mass ratios may be measured and calculated by the methods described in Examples below.

<Carboxylic Acid>

The metal fine particle dispersion of the present invention preferably further contains a (poly)carboxylic acid having not less than 1 and not more than 24 carbon atoms, more preferably a monocarboxylic acid having not less than 1 and not more than 24 carbon atoms (hereinafter also referred to merely as a "monocarboxylic acid"), from the viewpoint of improving dispersion stability of the metal fine particles and storage stability of the resulting dispersion. The aforementioned carboxylic acid may also contain a functional group other than a carboxy group. Examples of the functional group other than a carboxy group include functional groups that can be coordinated to the metal fine particles, such as a functional group containing a halogen atom, a functional group containing at least one hetero atom, such as a thiol group, a hydroxy group, etc., and the like.

The number of carbon atoms contained in the monocarboxylic acid is preferably not less than 1, and is also preferably not more than 20, more preferably not more than 16, even more preferably not more than 10, further even more preferably not more than 8 and still further even more preferably not more than 6.

The monocarboxylic acid is preferably in the form of a saturated aliphatic monocarboxylic acid from the viewpoint of improving dispersion stability of the metal fine particles and storage stability of the resulting dispersion.

Examples of the saturated aliphatic monocarboxylic acid include linear aliphatic carboxylic acids such as formic acid, acetic acid, propionic acid, butyric acid, valeric acid, caproic acid, caprylic acid, capric acid, lauric acid, palmitic acid, etc., and the like. Among these saturated aliphatic mono-carboxylic acids, preferred is at least one acid selected from the group consisting of formic acid, acetic acid and propi-onic acid, more preferred is at least one acid selected from the group consisting of acetic acid and formic acid, and even more preferred is a combination of acetic acid and formic acid.

In the case where the monocarboxylic acid is contained in the metal fine particle dispersion, the content of the mono-carboxylic acid in the metal fine particle dispersion is preferably not less than 0.1% by mass, more preferably not less than 0.3% by mass and even more preferably not less than 0.5% by mass, and is also preferably not more than 30% by mass, more preferably not more than 20% by mass, even more preferably not more than 10% by mass, further even more preferably not more than 5% by mass, still further even more preferably not more than 3% by mass and furthermore preferably not more than 2% by mass, from the viewpoint of improving dispersion stability of the metal fine particles and storage stability of the resulting dispersion.

In the case where the monocarboxylic acid is contained in the metal fine particle dispersion, the mass ratio of the monocarboxylic acid to the metal [monocarboxylic acid/metal] in the metal fine particle dispersion is preferably not less than 0.005, more preferably not less than 0.01, even more preferably not less than 0.02 and further even more preferably not less than 0.03, and is also preferably not more than 1.5, more preferably not more than 1, even more preferably not more than 0.5 and further even more prefer-ably not more than 0.1, from the viewpoint of improving dispersion stability of the metal fine particles and storage stability of the resulting dispersion.

The content of the monocarboxylic acid in the metal fine particle dispersion and the aforementioned mass ratio [monocarboxylic acid/metal] may be measured and calcu-lated by the methods described in Examples below.

The concentration of the metal in the metal fine particle dispersion is preferably not less than 2% by mass, more preferably not less than 5% by mass, even more preferably not less than 10% by mass, further even more preferably not less than 15% by mass and still further even more preferably not less than 20% by mass, for example, from the viewpoint of facilitating preparation of the ink using the aforemen-tioned dispersion, and is also preferably not more than 85% by mass, more preferably not more than 70% by mass, even more preferably not more than 50% by mass and further even more preferably not more than 40% by mass from the viewpoint of improving dispersion stability of the metal fine particles and storage stability of the resulting dispersion.

Incidentally, the concentration of the metal in the metal fine particle dispersion may be measured and calculated by the method described in Examples below.

(Production of Metal Fine Particle Dispersion)

The metal fine particle dispersion of the present invention may be produced by a method (i) of adding a dispersing medium to metal fine particles preliminarily prepared by conventionally known methods, followed by mixing the resulting dispersion, a method (ii) of mixing a metal raw material compound A, a dispersant B and a reducing agent C with each other to subject the metal raw material com-pound A to reduction reaction, and the like. Among these methods, from the viewpoint of improving dispersion sta-bility of the metal fine particles and storage stability of the resulting dispersion, preferred is the method (ii) including the following step 1.

Step 1: mixing the metal raw material compound A, the dispersant B and the reducing agent C with each other.

By conducting the aforementioned step 1, the metal raw material compound A is subjected to reduction reaction by the reducing agent C so as to form metal fine particles that are dispersed with the dispersant B. In the step 1, the metal raw material compound A, the dispersant B and the reducing agent C may be mixed with each other by conventionally known methods, and the order of mixing of the respective components is not particularly limited.

The temperature used in the reduction reaction is prefer-ably not lower than 10° C., more preferably not lower than 20° C. and even more preferably not lower than 30° C., and is also preferably not higher than 70° C., more preferably not higher than 60° C. and even more preferably not higher than 50° C. The reduction reaction may be conducted either in atmospheric air or in an atmosphere of an inert gas such as nitrogen gas, etc.

<Metal Raw Material Compound A>

The metal raw material compound A is not particularly limited as long as it is a compound containing the afore-mentioned metal. Examples of the metal raw material com-pound A include metal salts of inorganic acids or organic acids, metal oxides, metal hydroxides, metal sulfides, metal halides and the like. Specific examples of the aforemen-tioned metal salts include metal salts of inorganic acids, such as nitric acid salts, nitrous acid salts, sulfuric acid salts, carbonic acid salts, ammonium salts, perchloric acid salts, etc.; metal salts of organic acids, such as acetic acid salts, etc.; and the like. These metal raw material compounds A may be used alone or in the form of a mixture of any two or more thereof. Among these metal raw material compounds A, preferred is at least one compound selected from the group consisting of metal salts of inorganic acids or organic acids, and metal oxides, more preferred is at least one compound selected from the group consisting of metal salts of nitric acid, and metal oxides, and even more preferred are metal oxides. In the case where the metal raw material compound A is in the form of a metal oxide, no counter ions of the metal ion are contained as impurities in the resulting dispersion, so that it is possible to obtain the metal fine particle dispersion without need of subjecting the dispersion to purification treatment such as dialysis, etc.

As the metal oxides, preferred are oxides of transition metals belonging to Groups 4 to 11 in the 4th to 6th Periods of the Periodic Table, more preferred are oxides of copper and noble metals such as gold, silver, platinum, palladium, etc., even more preferred is an oxide of at least one metal selected from the group consisting of gold, silver, copper and palladium, further even more preferred is at least one oxide selected from the group consisting of gold oxide, silver oxide and copper oxide, and still further even more preferred is at least one oxide selected from the group consisting of silver oxide and gold oxide.

<Reducing Agent C>

The reducing agent C used herein is not particularly limited, and may be either an inorganic reducing agent or an organic reducing agent.

Examples of the organic reducing agent include alcohols such as ethylene glycol, propylene glycol, etc.; aldehydes such as formaldehyde, acetaldehyde, propionaldehyde, etc.; acids such as ascorbic acid, citric acid, etc., and salts thereof; aliphatic amines, e.g., alkanolamines such as ethanolamine, N-methyl ethanolamine, N,N-dimethyl ethanolamine (2-(dimethylamino)ethanol), N,N-diethyl ethanolamine, diethanolamine, N-methyl diethanolamine, triethanolamine, propanolamine, N,N-dimethyl propanolamine, butanolamine, hexanolamine, etc., alkyl amines such as propylamine, butylamine, hexylamine, diethylamine, dipropylamine, dimethylethylamine, diethylmethylamine, triethylamine, etc., and (poly)alkylene polyamines such as ethylenediamine, triethylenediamine, tetramethyl ethylenediamine, diethylenetriamine, dipropylenetriamine, triethylenetetramine, tetraethylenepentamine, etc.; alicyclic amines such as piperidine, pyrrolidine, N-methyl pyrrolidine, morpholine, etc.; aromatic amines such as aniline, N-methyl aniline, toluidine, anisidine, phenetidine, etc.; aralkyl amines such as benzylamine, N-methyl benzylamine, etc.; and the like.

Examples of the inorganic reducing agent include boron hydride salts such as sodium boron hydride, ammonium boron hydride, etc.; aluminum hydride salts such as lithium aluminum hydride, potassium aluminum hydride, etc.; hydrazines such as hydrazine, hydrazine carbonate, etc.; hydrogen gas; and the like.

Incidentally, these reducing agents C may be used alone or in combination of any two or more thereof.

The reducing agent C is preferably the organic reducing agent, more preferably at least one compound selected from the group consisting of alcohols and amines, even more preferably at least one compound selected from the group consisting of ethylene glycol, propylene glycol and an alkanol amine having not less than 2 and not more than 6 carbon atoms, and further even more preferably at least one compound selected from the group consisting of propylene glycol and N,N-dimethyl ethanolamine.

In the case where the propylene glycol is used as the reducing agent C, the propylene glycol is oxidized upon the reduction reaction to thereby produce hydroxyacetone. Therefore, by suitably adjusting the conditions of the reduction reaction, it is possible to control contents of the hydroxyacetone and the propylene glycol in the metal fine particle dispersion. In addition, since the propylene glycol also has a function as a dispersing medium for the metal fine particle dispersion, no step of separately adding an additional dispersing medium is required, which is preferable from the standpoint of facilitated production of the metal fine particle dispersion. Moreover, in the embodiment in which the metal fine particle dispersion further contains the monocarboxylic acid, when adjusting the conditions of the reduction reactions by using the propylene glycol as the reducing agent, the aforementioned hydroxyacetone is further oxidized upon the reduction reaction to thereby produce formic acid and acetic acid. In such a case, no step of separately adding an additional monocarboxylic acid is required, which is also preferable from the standpoint of facilitated production of the metal fine particle dispersion.

In the case where a reducing agent other than the propylene glycol is used as the reducing agent C, it is preferred that the step 1 includes the following step 1-1 and step 1-2.

Step 1-1: mixing a mixture containing the metal raw material compound A and the dispersant B with the reducing agent C to obtain a dispersion liquid of metal fine particles; and Step 1-2: adding the propylene glycol to the dispersion liquid of the metal fine particles obtained in the step 1-1 and then adding the hydroxyacetone thereto.

The metal raw material compound A and the dispersant B used in the step 1-1 may be the same as those described above. The metal raw material compound A is preferably a metal salt of nitric acid, and more preferably silver nitrate.

In the step 1-1, there may be further used a water-based solvent D. The water-based solvent D used in the step 1-1 preferably contains water as a main component, and may further contain an organic solvent. Examples of the organic solvent include aliphatic alcohols having not less than 1 and not more than 4 carbon atoms, such as ethanol, 2-propanol, etc., ketones having not less than 3 and not more than 8 carbon atoms, such as acetone, etc., ethers such as tetrahydrofuran, etc., and the like.

The content of water in the water-based solvent D is preferably not less than 60% by mass, more preferably not less than 70% by mass, even more preferably not less than 90% by mass and further even more preferably not less than 95% by mass from the viewpoint of improving environmental suitability of the resulting dispersion.

When using the water-based solvent D in the step 1-1, the water-based solvent D may also be used as a dispersing medium for the resulting metal fine particle dispersion. In addition, in the step 1-2, after adding the propylene glycol to the dispersion liquid of the metal fine particles obtained in the step 1-1, the water-based solvent D may be removed by distillation from the resulting dispersion.

(Amounts of Respective Components Charged)

The amounts of the respective components charged on the basis of a total amount of the metal raw material compound A, the dispersant B and the reducing agent C charged upon production of the metal fine particle dispersion are as follows, from the viewpoint of improving dispersion stability of the metal fine particles and storage stability of the resulting dispersion as well as from the viewpoint of enhancing productivity of the dispersion.

The amount of the metal raw material compound A charged on the basis of a total amount of the metal raw material compound A, the dispersant B and the reducing agent C charged is preferably not less than 10% by mass, more preferably not less than 20% by mass and even more preferably not less than 30% by mass, and is also preferably not more than 60% by mass, more preferably not more than 50% by mass and even more preferably not more than 40% by mass.

The amount of the dispersant B charged on the basis of a total amount of the metal raw material compound A, the dispersant B and the reducing agent C charged is preferably not less than 0.2% by mass, more preferably not less than 0.5% by mass and even more preferably not less than 1% by mass, and is also preferably not more than 10% by mass, more preferably not more than 7% by mass and even more preferably not more than 5% by mass.

The amount of the reducing agent C charged on the basis of a total amount of the metal raw material compound A, the dispersant B and the reducing agent C charged is preferably not less than 25% by mass, more preferably not less than 40% by mass and even more preferably not less than 50% by mass, and is also preferably not more than 95% by mass, more preferably not more than 90% by mass and even more preferably not more than 85% by mass.

In the case where using the water-based solvent D, the amount of the water-based solvent D charged on the basis of 100 parts by mass of a total amount of the metal raw material compound A, the dispersant B and the reducing agent C charged is preferably not less than 10 parts by mass, more preferably not less than 20 parts by mass and even more preferably not less than 30 parts by mass, and is also preferably not more than 60 parts by mass, more preferably not more than 50 parts by mass and even more preferably not more than 40 parts by mass.

In the present invention, from the viewpoint of removing impurities such as the unreacted reducing agent, a surplus of the polymer (b) which has no contribution to dispersion of the metal fine particles, etc., the aforementioned method may further include the step of purifying the metal fine particle dispersion obtained in the step 1 or the dispersion liquid of the metal fine particles obtained in the step 1-1.

The method of purifying the metal fine particle dispersion or the dispersion liquid of the metal fine particles is not particularly limited, and there may be used various methods including membrane treatments such as dialysis, ultrafiltration, etc.; centrifugal separation treatments; and the like. Among these methods, from the viewpoint of efficiently removing the impurities from the resulting dispersion, preferred are the membrane treatments, and more preferred is dialysis. As a material of a dialysis membrane used in the dialysis, there is preferably used a regenerated cellulose.

The molecular weight cutoff of the dialysis membrane is preferably not less than 1,000, more preferably not less than 5,000 and even more preferably not less than 10,000, and is also preferably not more than 100,000 and more preferably not more than 70,000, from the viewpoint of efficiently removing the impurities from the resulting dispersion.

The metal fine particle dispersion of the present invention is excellent in dispersion stability of the metal fine particles therein, as well as storage stability under high-temperature conditions. Therefore, a metal film formed using the metal fine particle dispersion can exhibit excellent properties and functions, so that it is possible to use the metal fine particle dispersion in more extensive applications. Examples of the applications of the metal fine particle dispersion include various inks; conductive materials such as wiring materials, electrode materials, MLCC (multi-layer ceramic capacitor; hereinafter also referred to merely as "MLCC"), etc.; bonding materials such as solders, etc.; various sensors; antennas for automatic identification technique (RFID: radio frequency identifier; hereinafter also referred to merely as "RFID") tags using short-range radio communication, etc.; catalysts; optical materials; medical materials; and the like.

[Ink]

The ink of the present invention contains the metal fine particle dispersion. Since the metal fine particle dispersion contains the metal fine particles having a cumulant average particle size of not more than 0.1 μm, it is possible to reduce irregularities on the surface of a metal film when forming the metal film from the ink. In addition, it is considered that since the hydroxyacetone and the propylene glycol tend to be readily desorbed from the surface of the metal film owing to their low molecular weights during a drying step of the ink upon forming the metal film using the ink and therefore the metal fine particles tend to come into close contact with each other, so-called plasmon colors are likely to disappear from the surface of the metal film, and inherent metallic luster thereof is exhibited, so that the resulting metal film can be improved in glossiness.

Moreover, the hydroxyacetone and the propylene glycol contained in the metal fine particle dispersion tend to be readily desorbed from the surface of the metal film owing to their low molecular weights during a sintering step of the metal fine particles upon forming the metal film using the ink, and necking between the metal fin particles tends to proceed rapidly, so that it is possible to form a metal film having high conductivity.

The aforementioned ink is preferably in the form of a water-based ink that is prepared by mixing the metal fine particle dispersion and water (hereinafter also referred to merely as a "water-based ink") from the viewpoint of reducing a burden on working environments and natural environments.

The term "water-based ink" as used in the present invention means an ink in which water has a largest content among components of a medium contained in the ink.

The ink preferably contains an organic solvent from the viewpoint of improving storage stability of the ink. The organic solvent preferably contains one or more organic solvents having a boiling point of not lower than 90° C. The weighted mean value of boiling points of the one or more organic solvents is preferably not lower than 150° C. and more preferably not lower than 180° C., and is also preferably not higher than 240° C., more preferably not higher than 220° C. and even more preferably not higher than 200° C.

Examples of the aforementioned organic solvent include a polyhydric alcohol, a polyhydric alcohol alkyl ether, a nitrogen-containing heterocyclic compound, an amide, an amine, a sulfur-containing compound and the like. Of these organic solvents, preferred is at least one compound selected from the group consisting of a polyhydric alcohol and a polyhydric alcohol alkyl ether, and more preferred is at least one compound selected from the group consisting of ethylene glycol, propylene glycol, diethylene glycol, triethylene glycol, polyethylene glycol, glycerin, trimethylolpropane, diethylene glycol diethyl ether and diethylene glycol monoisobutyl ether.

Incidentally, the propylene glycol may be derived from the aforementioned metal fine particle dispersion.

The aforementioned ink may further contain various additives that may be usually used in inks, such as a fixing assistant such as a dispersion of polymer particles, etc., a humectant, a wetting agent, a penetrant, a surfactant, a viscosity modifier, a defoaming agent, an antiseptic agent, a mildew-proof agent, a rust preventive, etc., if required, and further may be subjected to filtration treatment using a filter, etc. The contents of the respective components in the aforementioned ink as well as properties of the ink are as follows.

(Contents of Respective Components in Ink)

The content of the metal in the aforementioned ink is preferably not less than 1% by mass, more preferably not less than 3% by mass and even more preferably not less than 5% by mass from the viewpoint of enhancing optical density of the ink as well as from the viewpoint of improving conductivity of the ink, and is also preferably not more than 50% by mass, more preferably not more than 35% by mass, even more preferably not more than 20% by mass, further even more preferably not more than 17% by mass, still further even more preferably not more than 15% by mass, furthermore preferably not more than 13% by mass and still furthermore preferably not more than 11% by mass from the viewpoint of improving glossiness of the resulting metal film as well as from the viewpoint of reducing viscosity of the ink upon volatilization of the solvent therefrom and improving storage stability of the resulting ink.

The content of the metal in the ink may be measured by the method described in Examples below.

The total content of the metal and the polymer (b) in the ink is preferably not less than 2% by mass, more preferably not less than 5% by mass and even more preferably not less than 7% by mass from the viewpoint of enhancing optical density of the ink as well as from the viewpoint of improving conductivity of the resulting ink, and is also preferably not more than 55% by mass, more preferably not more than 40% by mass, even more preferably not more than 22% by mass, further even more preferably not more than 20% by mass, still further even more preferably not more than 17% by mass, furthermore preferably not more than 15% by mass and still furthermore preferably not more than 13% by mass from the viewpoint of reducing viscosity of the resulting ink upon volatilization of the solvent therefrom and improving storage stability of the resulting ink.

The total content of the metal and the polymer (b) in the ink may be calculated from the content of the metal in the ink and the mass ratio [polymer (b)/(polymer (b)+metal)] which may be calculated by the methods described in Examples below.

The content of the organic solvent in the ink is preferably not less than 10% by mass, more preferably not less than 15% by mass, even more preferably not less than 18% by mass and further even more preferably not less than 20% by mass, and is also preferably not more than 50% by mass, more preferably not more than 45% by mass and even more preferably not more than 40% by mass, from the viewpoint of improving storage stability of the resulting ink.

The content of water in the ink is preferably not less than 20% by mass, more preferably not less than 40% by mass and even more preferably not less than 60% by mass from the viewpoint of reducing a burden on working environments and natural environments as well as from the viewpoint of improving storage stability of the resulting ink, and is also preferably not more than 80% by mass, more preferably not more than 75% by mass and even more preferably not more than 70% by mass from the viewpoint of enhancing optical density of the resulting ink.

The mass ratio of the metal to the whole solid components in the aforementioned ink [metal/(whole solid components in ink)] is preferably not less than 0.3, more preferably not less than 0.5, even more preferably not less than 0.7 and further even more preferably not less than 0.8 from the viewpoint of enhancing optical density and conductivity of the resulting ink, and is also preferably not more than 0.98, more preferably not more than 0.96 and even more preferably not more than 0.94 from the viewpoint of improving storage stability of the resulting ink and glossiness of the resulting metal film.

The mass ratio of [metal/(whole solid components in ink)] may be measured by the method described in Examples below.

(Properties of Ink)

The cumulant average particle size of the metal fine particles in the aforementioned ink is preferably the same as the cumulant average particle size of the metal fine particles in the metal fine particle dispersion, and the preferred range of the cumulant average particle size of the metal fine particles in the ink is also the same as the preferred range of the cumulant average particle size of the metal fine particles in the metal fine particle dispersion.

The viscosity of the aforementioned ink as measured at 32° C. is preferably not less than 2 mPa·s, more preferably not less than 3 mPa·s and even more preferably not less than 4 mPa·s, and is also preferably not more than 12 mPa·s, more preferably not more than 9 mPa·s and even more preferably not more than 7 mPa·s, from the viewpoint of improving storage stability of the resulting ink. The viscosity of the ink may be measured using an E-type viscometer.

The pH value of the aforementioned ink as measured at 20° C. is preferably not less than 7.0, more preferably not less than 7.2 and even more preferably not less than 7.5 from the viewpoint of improving storage stability of the resulting ink, and is also preferably not more than 11, more preferably not more than 10 and even more preferably 9.5 from the viewpoint of improving the resistance of members to the ink and suppressing skin irritation. The pH value of the ink may be measured by an ordinary method.

[Ink-Jet Printing Method]

In the present invention, it is possible to obtain a printed material on which a metal film is formed by applying the aforementioned ink onto a printing medium.

The aforementioned ink is capable of not only forming a metal film that has a less number of irregularities on the surface thereof and is excellent in metallic design with metallic luster, but also exhibiting excellent storage stability under high-temperature conditions, and therefore can be suitably used for metallic printing, in particular, as an ink for flexographic printing, an ink for gravure printing, an ink for screen printing or an ink for ink-jet printing. In addition, the aforementioned ink is also capable of forming a metal film that can exhibit high conductivity. In particular, since the aforementioned ink contains the metal fine particles, the ink is more preferably used as an ink for ink-jet printing in view of excellent ejection properties thereof. That is, as the method of applying the aforementioned ink onto a printing medium, there is preferably used the ink-jet printing method.

In the case of using the aforementioned ink as an ink for ink-jet printing, the ink may be loaded to a conventionally known ink-jet printing apparatus from which droplets of the ink are ejected onto a printing medium to print characters or images, etc., on the printing medium.

Although the ink-jet printing apparatus may be of either a thermal type or a piezoelectric type, the ink containing the water-based pigment dispersion of the present invention is preferably used as an ink for ink-jet printing using an ink-jet printing apparatus of a piezoelectric type.

Examples of the printing medium used when printing characters or images thereon using the aforementioned ink include a plain paper, a low-water absorbing coated paper and a non-water absorbing resin film. Specific examples of the coated paper include a versatile glossy coated paper, a multi-color foam glossy coated paper, and the like. Among these printing media, preferred is the resin film from the viewpoint of improving glossiness of the resulting metal film as well as from the viewpoint of using the metal film capable of exhibiting good conductivity in adequate applications. As the resin film, preferred is at least one resin film selected from the group consisting of a polyester film such as a polyethylene terephthalate (PET) film, a polyethylene naphthalate (PEN) film, etc., a polyvinyl chloride film, a polypropylene film and a polyethylene film, and more preferred is a polyester film. As the resin film, there may also be used those substrates subjected to corona treatment.

Examples of generally commercially available products of the resin film include "LUMIRROR T60" (polyester) available from Toray Industries Inc., "TEONEX Q51-A4" (polyethylene naphthalate) available from Teijin Film Solutions Ltd., "PVC80B P" (polyvinyl chloride) available from Lintec Corporation, "DGS-210WH" (polyvinyl chloride) available from Roland DG Corporation, a transparent polyvinyl chloride film "RE-137" (polyvinyl chloride) available from MIMAKI ENGINEERING Co., Ltd., "KINATH KEE 70CA" (polyethylene) available from Lintec Corporation, "YUPO SG90 PAT1" (polypropylene) available from Lintec Corporation, "FOR" and "FOA" (polypropylene) both available from Futamura Chemical Co., Ltd., "BONYL RX" (nylon) available from Kohjin Film & Chemicals Co., Ltd., "EMBLEM ONBC" (nylon) available from UNITIKA Ltd., and the like.

(Ink-Jet Printing Conditions)

The temperature of the ink-jet print head is preferably not lower than 15° C., more preferably not lower than 20° C. and even more preferably not lower than 25° C. and is also preferably not higher than 45° C. more preferably not higher than 40° C. and even more preferably not higher than 35° C., from the viewpoint of improving metallic luster of the resulting metal film as well as conductivity of the metal film.

The head voltage applied to the ink-jet print head is preferably not less than 5 V, more preferably not less than 10 V and even more preferably not less than 15 V, and is also preferably not more than 40 V, more preferably not more than 35 V and even more preferably not more than 30 V, from the viewpoint of improving printing efficiency, etc.

The drive frequency of the print head is preferably not less than 1 kHz, more preferably not less than 5 kHz and even more preferably not less than 10 kHz, and is also preferably not more than 50 kHz, more preferably not more than 40 kHz and even more preferably not more than 35 kHz, from the viewpoint of improving printing efficiency, etc.

The amount of droplets of the ink ejected is preferably not less than 5 pL and more preferably not less than 10 pL, and is also preferably not more than 30 pL and more preferably not more than 25 pL, as calculated per one ink droplet ejected, from the viewpoint of improving metallic luster of the resulting metal film as well as conductivity of the metal film.

The amount of the ink applied onto the printing medium in terms of a solid content thereof is preferably not less than 0.5 $g/m^2$, more preferably not less than 1 $g/m^2$ and even more preferably not less than 2 $g/m^2$, and is also preferably not more than 20 $g/m^2$, more preferably not more than 15 $g/m^2$ and even more preferably not more than 10 $g/m^2$.

The resolution of images printed by the ink-jet printing is preferably not less than 200 dpi and more preferably not less than 300 dpi, and is also preferably not more than 1,000 dpi, more preferably not more than 800 dpi and even more preferably not more than 600 dpi. Meanwhile, the term "resolution" as used in the present specification means the number of dots per inch (2.54 cm) which are formed on the printing medium. For example, the "resolution of 600 dpi" means that when the ink droplets are ejected onto the printing medium using a line print head on which a nozzle row is arranged such that the number of nozzle ports per a length of the nozzle row corresponds to 600 dpi (dots/inch), a corresponding dot row of 600 dpi is formed in the direction perpendicular to a transporting direction of the printing medium, and further when ejecting the ink droplets while moving the printing medium in the transporting direction thereof, the dot row of 600 dpi is also formed on the printing medium along the transporting direction thereof. In the present specification, it is assumed that the value of the resolution in the direction perpendicular to the transporting direction of the printing medium is the same as the value of the resolution in the transporting direction of the printing medium.

(Heat Treatment)

In the present invention, from the viewpoint of improving metallic luster of the resulting metal film as well as from the viewpoint of improving conductivity of the metal film, it is preferred that after applying the aforementioned ink onto the printing medium, the obtained ink coating film on the printing medium is subjected to heat treatment.

By conducting such a heat treatment, it is possible to form a metal film that is capable of not only exhibiting metallic luster by subjecting the medium in the ink coating film to evaporation to dryness, but also further exhibiting conductivity by sintering the metal fine particles in the ink.

The method of conducting the heat treatment is not particularly limited. The heat treatment may be conducted by a method of blowing a hot air against a surface of the ink coating film on the printing medium to heat the ink, a method of approaching a heater to the surface of the ink coating film on the printing medium to heat the ink, a method of bringing a heater into contact with a surface of the printing medium opposed to its surface on which the ink coating film is formed, to heat the ink, a method of heating the ink on the printing medium by steam curing treatment using a high-temperature steam under an ordinary pressure or under a high pressure, and the like.

The temperature used upon the heat treatment is preferably lower than the temperature at which the printing medium suffers from deformation.

The heat treatment is conducted under an ordinary pressure at a temperature of preferably not lower than 40° C., more preferably not lower than 50° C. and even more preferably not lower than 55° C., and also preferably not higher than 90° C., more preferably not higher than 80° C. and even more preferably not higher than 70° C., from the viewpoint of improving glossiness of the resulting metal film. In this case, the heat treatment time is preferably not less than 1 minute, and is also preferably not more than 30 minutes, more preferably not more than 20 minutes, even more preferably not more than 10 minutes and further even more preferably not more than 5 minutes.

In addition, from the viewpoint of improving conductivity of the resulting metal film, the heat treatment temperature is preferably not lower than 130° C., more preferably not lower than 150° C. and even more preferably not lower than 170° C., and is also preferably not higher than 300° C., more preferably not higher than 250° C. and even more preferably not higher than 230° C., and the heat treatment pressure is preferably not less than 3 kPa, more preferably not less than 5 kPa and even more preferably not less than 7 kPa, and is also preferably not more than 50 kPa, more preferably not more than 30 kPa and even more preferably not more than 10 kPa. In this case, the heat treatment time is preferably not less than 10 minutes, more preferably not less than 30 minutes and even more preferably not less than 50 minutes, and is also preferably not more than 6 hours, more preferably not more than 4 hours and even more preferably not more than 2 hours.

The thickness of the metal film is preferably not less than 0.1 μm, more preferably not less than 0.3 μm and even more preferably not less than 0.5 μm, and is also preferably not more than 5 μm, more preferably not more than 4 μm and even more preferably not more than 3 μm.

The volume resistivity of the metal film is preferably not more than $5\times10^{-5}$ Ω·cm, more preferably not more than $4\times10^{-5}$ Ω·cm, even more preferably not more than $3\times10^{-5}$ Ω·cm and further even more preferably not more than $2\times10^{-5}$ Ω·cm. From the viewpoint of facilitating production of a printed material, the volume resistivity of the metal film is preferably not less than $2\times10^{-6}$ Ω·cm, more preferably not less than $4\times10^{-6}$ Ω·cm and even more preferably not less than $6\times10^{-6}$ Ω·cm.

The aforementioned volume resistivity may be measured by the method described in Examples below.

The metal film formed from the aforementioned ink is capable of exhibiting high conductivity and therefore can be used as a conductive member for various electronic and electric equipments. The conductive member is preferably used in the applications including RFID tags; capacitors such as MLCC, etc.; electronic paper; image display apparatuses such as liquid crystal display, organic EL display, etc.; organic EL elements; organic transistors; circuit boards such as a printed circuit board, a flexible circuit board, etc.; organic solar cells; sensors such as flexible sensors, etc.; bonding agents such as solders, etc.; and the like. Among these applications, from the viewpoint of facilitating production of the metal film by an ink-jet printing method, the metal film is preferably used for RFID tags and MLCC.

[RFID Tag]

In the RFID tag of the present invention, the metal film formed from the aforementioned ink is preferably included as an antenna for RFID tag. The antenna for RFID tag may be produced by applying the aforementioned ink onto a substrate and sintering the metal fine particles contained in the ink.

As the substrate of the antenna for RFID tag, there may be mentioned the aforementioned printing medium.

Examples of the method of applying the aforementioned ink when forming the antenna for RFID tag therefrom include ink-jet printing, screen printing, flexographic printing, gravure printing, offset printing, dispenser printing, slot die coating, dip coating, spray coating, spin coating, doctor blading, knife edge coating, bar coating, and the like. Among these methods, from the viewpoint of facilitating formation of a pattern of the antenna, preferred is an ink-jet printing method. The printing conditions used in the ink-jet printing method are the same as described previously.

The aforementioned RFID tag may be manufactured by mounting a communication circuit such as a semiconductor chip, etc., to the aforementioned antenna for RFID tag and electrically connecting the antenna and the communication circuit to each other. More specifically, after applying, for example, an anisotropic conductive adhesive (ACP), etc., to a semiconductor chip-mounting portion on the antenna for RFID tag and arranging the semiconductor chip on the mounting portion, the semiconductor chip can be fixedly mounted to the antenna using a thermocompression bonding apparatus.

From the viewpoint of suppressing deterioration in conductivity of the antenna for RFID tag, the aforementioned RFID tag may also have such a structure that the antenna for RFID tag on which the semiconductor chip is mounted is sealingly enclosed by a resin film, a paper, etc., attached thereto through a bonding agent or an adhesive, or a resin coating formed by applying a resin thereonto.

Examples of the configuration of the RFID tag include those configurations constituted of the antenna for RFID tag and the communication circuit, such as an inlay type, a label type, a card type, a coin type, a stick type, and the like. The configuration of the RFID tag may be appropriately selected from these types, and the RFID tag may be processed into any suitable configuration, according to the use or applications thereof.

The shape and size of a pattern of the antenna for RFID tag may also be appropriately selected according to the use or applications thereof. In addition, the communication range of of the RFID tag may be suitably selected according to the shape and size of the pattern of the antenna for RFID tag.

[Multi-Layer Ceramic Capacitor]

The multi-layer ceramic capacitor (MLCC) of the present invention preferably includes the metal film formed from the aforementioned ink as an internal electrode layer thereof.

Since the ink contains the metal fine particles, it is possible to reduce a thickness of the internal electrode layer of the MLCC and therefore downsize the MLCC.

The aforementioned MLCC may be manufactured by first forming a multi-layer laminated sheet such that dielectric layers and the internal electrode layers formed from the aforementioned ink are alternately laminated on each other, and then baking the thus formed multi-layer laminated sheet to obtain a capacitor baked body serving as a main body of the capacitor.

The multi-layer laminated sheet may be produced by a printing method in which a ceramic slurry for forming the dielectric layer and the aforementioned ink are alternately laminated by printing on a printing medium; a sheeting method in which a plurality of sheets each obtained by applying the aforementioned ink onto an unbaked ceramic green sheet formed from the ceramic slurry for forming the dielectric layer are prepared and laminated on each other so as to alternately arrange the dielectric layers and the internal electrode layers on each other; and the like.

As the ceramic slurry for forming the dielectric layer, there may be used such a slurry that is prepared, for example, by adding an organic binder such as polyvinyl butyral, etc., and a solvent to a ceramic raw material powder such as barium titanate, etc.

The multi-layer laminated sheet is cut into chips having a predetermined size and then subjected to heat treatment to remove organic substances such as polymers, etc., therefrom by combustion thereof, and thereafter the resulting product is baked in an atmosphere of a reducing gas to obtain the capacitor baked body.

The removal of the organic substances by combustion is preferably conducted, for example, at a temperature of not lower than 180° C. and not higher than 400° C. for a time period of not less than 0.5 hour and not more than 24 hours.

The baking of the multi-layer laminated sheet is preferably conducted, for example, at a temperature of not lower than 700° C. and not higher than 1400° C. for a time period of not less than 0.5 hour and not more than 8 hours.

A pair of external electrodes are formed at opposite ends of the resulting capacitor baked body, and the respective external electrodes are electrically connected to the respective internal electrode layers to obtain the MLCC.

The thickness of the internal electrode layer in the aforementioned MLCC is not particularly limited. However, the thickness of the internal electrode layer is preferably not more than 5 μm, more preferably not more than 3 μm and even more preferably not more than 1 μm from the viewpoint of reducing the thickness of the internal electrode layer and downsizing the MLCC, and is also preferably not less than 0.1 μm, more preferably not less than 0.3 μm and even more preferably not less than 0.5 μm from the viewpoint of facilitating production of the MLCC.

The thickness of the dielectric layer in the aforementioned MLCC is not particularly limited. However, the thickness of the dielectric layer is preferably not more than 5 μm, more preferably not more than 3 μm and even more preferably not more than 1 μm from the viewpoint of reducing the thickness of the dielectric layer and downsizing the MLCC, and is also preferably not less than 0.1 μm, more preferably not less than 0.3 μm and even more preferably not less than 0.5 μm from the viewpoint of facilitating production of the MLCC.

The thickness of each of the internal electrode layer and the dielectric layer may be measured using a scanning electron microscope (SEM).

EXAMPLES

In the following Examples and Comparative Examples, the "part(s)" and "%" indicate "part(s) by mass" and "% by mass", respectively, unless otherwise specified.

(1) Measurement of Cumulant Average Particle Size of Metal Fine Particles

A sample to be measured was subjected to cumulant analysis using a laser particle analyzing system "ELS-8000" available from Otsuka Electrics Co., Ltd., to measure a cumulant average particle size of metal fine particles therein. The measurement was conducted under the conditions including a temperature of 25° C., an angle between incident light and detector of 90° and a cumulative number of 100 times, and a refractive index of water (1.333) was input to the analyzing system as a refractive index of the dispersing medium. The concentration of the sample to be measured was controlled to $5 \times 10^{-3}\%$ (in terms of a solid content thereof).

(2-1) Measurement of Contents of Respective Components in Metal Fine Particle Dispersion The contents of respective components such as hydroxy acetne, propylene glycol, a polymer dispersant, a low-molecular weight carboxylic acid, etc., in the metal fine particle dispersion were quantitatively determined by the following method using $^1$H-NMR.

(Measuring Conditions)

Measuring device: "FT-NMR Mercury-400" available from Varian Medical Systems

Nucleus measured: $^1$H

Sample to be measured: Using a mixture prepared by mixing 0.2 g of the metal fine particle dispersion with 1.0 g of the following heavy water containing an internal standard.

Magnetic field strength: 14.09637 [T]

Number of scanning: 16 times

Measuring temperature: 30° C.

Relaxation time: 45 sec (Preparation of Heavy Water Containing Internal Standard)

TSP (sodium 3-(trimethylsilyl)propionate-2,2,3,3-d4) was weighed in an amount of 0.1 g in a 100 mL measuring flask, and then heavy water was added to the measuring flask until the contents of the measuring flask reached 100 mL. The contents of the measuring flask were allowed to stand overnight to completely dissolve solid components therein, thereby preparing heavy water containing TSP as an internal standard.

(Quantitative Determination of Contents of Respective Components in Metal Fine Particle Dispersion)

The contents of the respective components in the metal fine particle dispersion were quantitatively determined from integrated values of proton signals of the respective components on the basis of the obtained $^1$H-NMR spectrum. The quantitative determination was carried out using the integrated value at δ 4.1 ppm (for methylene protons of hydroxyacetone), the integrated value at δ 1.1 ppm (for methyl protons of propylene glycol), the integrated value at δ 1.8 ppm (for acetyl protons of acetic acid) and the integrated value at δ 7.9 ppm (for formyl protons of formic acid) assuming that the signal of TSP was observed at δ 0 ppm. The integrated values used for quantitative determination of the other components are described hereinlater.

(2-2) Qualitative Analysis of Respective Components in Metal Fine Particle Dispersion The qualitative analysis of the respective components in the metal fine particle dispersion was carried out using a gas chromatograph (GC). The measuring conditions used in the analysis are as follows.

GC: "Agilent 6890N Network GC" available from Agilent Technologies, Inc.

Hydrogen generator: "HG26S" available from GL Sciences Inc.

GC temperature conditions: After maintaining a sample to be measured at 40° C. for 5 minutes, the sample was heated from 40° C. to 240° C. at a temperature rise rate of 10° C./min, and maintained at 240° C. for 5 minutes.

Sample to be measured: Using a material prepared by mixing 0.1 g of the metal fine particle dispersion with 9.9 g of acetone, stirring the resulting mixture at 25° C. for 10 hours with a magnetic stirrer, and then subjecting the mixture to filtration treatment through a syringe filter "DISMIC-13HP" (PTFE; 0.2 μm) available from Advantec Co., Ltd.

Detection times for standard samples: 10.03 min for hydroxyacetone; 5.87 min for formic acid; 11.47 min for acetic acid; 2.48 min for acetone.

(3) Measurement of Weight-Average Molecular Weight and Number-Average Molecular Weight of Polymer (b)

The weight-average molecular weight and number-average molecular weight of the polymer (b) were measured by gel permeation chromatography [GPC apparatus: "HLC-8320GPC" available from Tosoh Corporation; columns: "TSKgel Super AWM-H", "TSKgel Super AW3000" and "TSKgel guardcolumn Super AW-H" all available from Tosoh Corporation; flow rate: 0.5 mL/min] using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using kits of monodisperse polystyrenes having previously known molecular weights [PStQuick B(F-550, F-80, F-10, F-1, A-1000), PStQuick C(F-288, F-40, F-4, A-5000, A-500] all available from Tosoh Corporation as a reference standard substance.

As a sample to be measured, there was used a dispersion prepared by mixing 0.1 g of the polymer (b) with 10 mL of the aforementioned eluent in a glass vial, stirring the resulting mixture at 25° C. for 10 hours with a magnetic stirrer, and then subjecting the mixture to filtration treatment through a syringe filter "DISMIC-13HP" (PTFE; 0.2 μm) available from Advantec Co., Ltd.

(4) Measurement of Acid Value of Polymer (b)

The acid value of the polymer (b) was measured by the same method as defined in JIS K 0070 except that only a mixed solvent of ethanol and an ether prescribed as a measuring solvent in JIS K 0070 was replaced with a mixed solvent containing acetone and toluene at a volume ratio [acetone:toluene] of 4:6.

(5) Measurement of Solid Content of Metal Fine Particle Dispersion or Ink

Sodium sulfate dried to constant weight in a desiccator was weighed in an amount of 10.0 g and charged into a 30 mL polypropylene container (φ: 40 mm; height: 30 mm), and about 1.0 g of a sample to be measured was added to the container. The contents of the container were mixed with each other and then accurately weighed. The resulting mixture was maintained in the container at 105° C. for 2 hours to remove volatile components therefrom, and further allowed to stand in a desiccator adjusted to room temperature (25° C.) for 15 minutes, followed by measuring a mass thereof. The mass of the sample after removing the volatile components therefrom was defined as a mass of solids therein. The solid content of the sample was calculated by dividing the mass of the solids by the mass of the sample initially added.

(6) Calculation of Mass Ratio [Polymer (b)/(Polymer (b)+Metal)]

Using a freeze dryer "Model No.: FDU-2100" available from TOKYO RIKAKIKAI CO., LTD., equipped with a dry chamber "Model No.: DRC-1000" available from TOKYO RIKAKIKAI CO., LTD., the resulting metal fine particle dispersion or ink was freeze-dried under the drying conditions including operations of freezing at −25° C. for 1 hour, pressure reduction at −10° C. for 9 hours and pressure reduction at 25° C. for 5 hours, in which a vacuum degree used upon the pressure reduction was 5 Pa, thereby obtaining a dry metal powder containing the polymer (b).

Using a differential thermogravimetric simultaneous measurement apparatus (TG/DTA) "STA7200RV" (tradename) available from Hitachi High-Tech Science Corporation, 10 mg of the dry metal powder as a sample to be measured was weighed in an aluminum pan cell, and heated from 35° C. to 550° C. at a temperature rise rate of 10° C./min to measure a reduced mass of the sample under an air flow of 50 mL/min. The reduced mass of the sample as measured in a temperature range of from 35° C. to 550° C. was defined as a mass of the polymer (b), and a mass of the residue at 550° C. was defined as a mass of the metal to calculate a mass ratio [polymer (b)/(polymer (b)+metal)].

(7) Calculation of Concentration of Metal in Metal Fine Particle Dispersion or Ink The concentration of the metal in the metal fine particle dispersion or the ink, i.e., the content of the metal in the metal fine particle dispersion or the ink, was calculated from the mass ratio [polymer (b)/(polymer (b)+metal)] obtained in the above item (6) and the solid content of the metal fine particle dispersion or the ink obtained in the above item (5).

<Production and Evaluation of Metal Fine Particle Dispersion>

Example 1-1

(Step 1)

A 100 mL eggplant-shaped flask was charged with 10 g of silver oxide (guaranteed grade) available from FUJIFILM Wako Pure Chemical Corporation as the metal raw material compound A, 0.8 g of an acrylic acid/maleic acid/alkoxy (polyethylene glycol/polypropylene glycol) acrylate (number of alkyleneoxide units: 32 mol; molar ratio [EP/PO]=75/25) copolymer [in the form of an absolute dry product (number-average molecular weight: 4,500; acid value: 20 mgKOH/g) of an aqueous solution of the copolymer having a solid content of 40% "DISPERBYK-190" (tradename) available from BYK Chemie GmbH] (the absolute dry product is hereinafter also referred to merely as "BYK-190dry") as the polymer (b), and 20 g of propylene glycol (guaranteed grade; hereinafter also referred to merely as "PG") available from FUJIFILM Wako Pure Chemical Corporation as the reducing agent C. and the contents of the flask were stirred at an ordinary temperature for 1 hour with a magnetic stirrer. Thereafter, the flask was dipped in a water bath at 40° C. so as to control an inside temperature of the flask to 40° C. After the inside temperature of the flask reached 40° C., the contents of the flask were stirred for 1 hour to subject them to reduction treatment, and then air-cooled, thereby obtaining a metal fine particle dispersion D1.

The mass ratio [polymer (b)/(polymer (b)+metal)] in the resulting metal fine particle dispersion D1 as well as the metal concentration therein were measured and calculated, and the cumulant average particle size of the metal fine particles in the dispersion was measured, by the aforementioned methods.

In addition, qualitative determination of the respective components contained in the resulting metal fine particle dispersion D1 was conducted using GC. As a result, it was confirmed that hydroxyacetone, acetic acid and formic acid were produced. The contents of the respective components contained in the metal fine particle dispersion D1 were determined by the aforementioned $^1$H-NMR, and the respective mass ratios were calculated from the thus determined contents of the respective components. However, the content of "BYK-190dry" in the metal fine particle dispersion D1 was determined from the mass ratio [polymer (b)/(polymer (b)+metal)] in the metal fine particle dispersion D1 and the solid content of the metal fine particle dispersion obtained by the aforementioned methods.

The results are shown in Table 1.

Example 1-2

(Step 1-1)

A 100 mL glass beaker was charged with 14 g of silver nitrate as the metal raw material compound A, 0.8 g of "BYK-190dry" as the polymer (b) and 14 g of ion-exchanged water as the water-based solvent D, and the contents of the glass beaker were stirred at an ordinary temperature with a magnetic stirrer until they became transparent, thereby obtaining a mixture. Next, 23 g of N,N-dimethyl ethanolamine (DMAE) as the reducing agent C was charged into a 100 mL dropping funnel, and then added dropwise to the aforementioned mixture over 30 minutes. Thereafter, the contents of the glass beaker were stirred for 5 hours while immersing the glass beaker in a water bath at 40° C., and then the obtained reaction solution was air-cooled, thereby obtaining a dark brown water dispersion liquid (2) of metal fine particles. Then, the resulting water dispersion liquid (2) was allowed to stand for 1 hour.

(Purification Step)

The water dispersion liquid (2) of the metal fine particles obtained in the step 1-1 was charged into a regenerated cellulose dialysis tube "Spectra/Por 6" (molecular weight cutoff (MWCO)=50 K) available from Spectrum Laboratories Inc., and the dialysis tube was hermetically sealed with closers at opposite upper and lower ends thereof. The thus closed dialysis tube was dipped in 5 L of ion-exchanged water filled in a 5 L glass beaker, followed by stirring the dispersion for 1 hour. Thereafter, the whole amount of the ion-exchanged water was replaced with new one every one hour, and after the replacement procedure was repeated three times, the dispersion was continuously stirred for 24 hours to complete the dialysis, thereby obtaining a purified water dispersion liquid (2') of the metal fine particles.

(Step 1-2)

22 g of PG were added to and mixed in the thus purified water dispersion liquid (2') of the metal fine particles, and then the resulting dispersion was concentrated at 80° C. under reduced pressure (40 kPa) until water was no longer removed therefrom, thereby obtaining a metal fine particle dispersion (d2) containing PG as a dispersing medium. Furthermore, hydroxyacetone (guaranteed reagent) available from Tokyo Chemical Industry Co., Ltd., acetic acid (guaranteed reagent) available from Tokyo Chemical Industry Co., Ltd., and formic acid (guaranteed reagent) available from Tokyo Chemical Industry Co., Ltd., were added to the metal fine particle dispersion (d2) while stirring with a magnetic stirrer, thereby obtaining a metal fine particle dispersion D2 containing the respective components whose contents (%) in the metal fine particle dispersion were shown in Table 1.

In addition, the mass ratio [polymer (b)/(polymer (b)+ metal)] in the resulting metal fine particle dispersion D2 as well as the metal concentration therein were measured and calculated, and the cumulant average particle size of the metal fine particles in the dispersion was measured, by the aforementioned methods. The results are shown in Table 1.

Examples 1-3 and 1-4

The same procedure as in Example 1-2 was repeated except that the amount of the hydroxyacetone added in the step 1-2 was changed, and the contents (%) of the respective components in the metal fine particle dispersion were changed to those shown in Table 1, thereby obtaining metal fine particle dispersions D3 and D4.

Examples 1-5 and 1-6

The same procedure as in Example 1-2 was repeated except that in Example 1-5, PG added in the step 1-2 was changed to a combination of PG and ethylene glycol (guaranteed reagent; hereinafter also referred to merely as "EG") available from Tokyo Chemical Industry Co., Ltd., and in Example 1-6, the amount of PG added was changed, and the contents (%) of the respective components in the metal fine particle dispersion were changed to those shown in Table 1, thereby obtaining metal fine particle dispersions D5 and D6. The quantitative determination of EG was carried out using the integrated value at $\delta$ 3.7 ppm (for ethylene protons of EG) in $^1$H-NMR.

Examples 1-7 to 1-10

The same procedure as in Example 1-2 was repeated except that the kind and amount of the carboxylic acid added in the step 1-2 were changed, and the contents (%) of the respective components in the metal fine particle dispersion were changed to those shown in Table 1, thereby obtaining metal fine particle dispersions D7 to D10.

Incidentally, the acetic acid and formic acid used in Example 1-2 were changed to the other carboxylic acids, respectively, i.e., changed to fumaric acid in Example 1-8, and to propionic acid in Example 1-9. The quantitative determination of the fumaric acid was carried out using the integrated value at $\delta$ 6.6 ppm (for olefin protons of fumaric acid) in $^1$H-NMR, and the quantitative determination of the propionic acid was carried out using the integrated value at $\delta$ 2.4 ppm (for methylene protons of propionic acid) in $^1$H-NMR.

Example 1-11

The same procedure as in Example 1-1 was repeated except that the metal raw material compound A was changed to gold (III) oxide (guaranteed reagent) available from FUJIFILM Wako Pure Chemical Corporation, thereby obtaining a metal fine particle dispersion D11 shown in Table 1.

Example 1-12

The same procedure as in Example 1-2 was repeated except that PG added in the step 1-2 was changed to a combination of PG and EG, and the contents (%) of the respective components in the metal fine particle dispersion were changed to those shown in Table 1, thereby obtaining a metal fine particle dispersion D12.

Example 1-13

The same procedure as in Example 1-2 was repeated except that the amounts of the hydroxyacetone and PG added in the step 1-2 were changed, and the contents (%) of the respective components in the metal fine particle dispersion were changed to those shown in Table 1, thereby obtaining a metal fine particle dispersion D13.

Example 1-14

The same procedure as in Example 1-2 was repeated except that polyvinyl pyrrolidone (guaranteed reagent; weight-average molecular weight: 10,000) available from FUJIFILM Wako Pure Chemical Corporation was used as the polymer (b) in place of "BYK-190dry", thereby obtaining a metal fine particle dispersion D14 shown in Table 1. The quantitative determination of the polyvinyl pyrrolidone was carried out using the integrated value at $\delta$ 3.5 ppm (for methyl protons of a pyrrolidone ring bonded to the N atom of the polyvinyl pyrrolidone) in $^1$H-NMR.

Comparative Example 1-1

The same procedure as in Example 1-2 was repeated except that no hydroxyacetone was added, thereby obtaining a metal fine particle dispersion DC1 shown in Table 1.

Comparative Example 1-2

The same procedure as in Example 1-2 was repeated except that EG was used in place of PG, thereby obtaining a metal fine particle dispersion DC2 shown in Table 1.

(Storage Stability)

A 30 mL glass vial was charged with 10 g of the respective metal fine particle dispersions obtained in the aforementioned Examples and Comparative Examples. The respective metal fine particle dispersions charged in the glass vial were heated and stored in a thermostatic chamber at 80° C. for 7 days (for one week). Thereafter, the respective metal fine particle dispersions were allowed to stand at an ordinary temperature for 1 day to measure a cumulant average particle size of the metal fine particles therein by the same method as described above. The storage stability of the respective metal fine particle dispersions was evaluated by a cumulant average particle size ratio [cumulant average particle size after storage/cumulant average particle size before storage]. The closer to 1 the average particle size ratio becomes, the more excellent the storage stability of the metal fine particle dispersion is. The results are shown in Table 1.

TABLE 1

| | | | | | Metal fine particle dispersion | | | | |
| | | | | Contents (% by mass) of respective components in metal fine particle dispersion | | | | | |
| | | Kind | Metal | Hydroxy-acetone | PG | EG | Polymer (b) | Acetic acid | Formic acid | Other carboxylic acids |
|---|---|---|---|---|---|---|---|---|---|---|
| Examples | 1-1 | D1 | 31.7 | 1.7 | 62.6 | 0.0 | 2.7 | 1.0 | 0.3 | 0.0 |
| | 1-2 | D2 | 31.0 | 1.7 | 63.2 | 0.0 | 2.8 | 1.0 | 0.3 | 0.0 |
| | 1-3 | D3 | 31.8 | 0.2 | 63.7 | 0.0 | 2.8 | 1.1 | 0.4 | 0.0 |
| | 1-4 | D4 | 23.4 | 26.2 | 47.2 | 0.0 | 2.1 | 0.8 | 0.3 | 0.0 |
| | 1-5 | D5 | 31.2 | 1.6 | 0.5 | 62.6 | 2.8 | 1.0 | 0.3 | 0.0 |
| | 1-6 | D6 | 15.8 | 0.8 | 81.3 | 0.0 | 1.4 | 0.5 | 0.2 | 0.0 |
| | 1-7 | D7 | 32.6 | 1.6 | 63.0 | 0.0 | 2.8 | 0.0 | 0.0 | 0.0 |
| | 1-8 | D8 | 29.9 | 1.6 | 64.4 | 0.0 | 2.8 | 0.0 | 0.0 | 1.4 (*1) |
| | 1-9 | D9 | 29.8 | 1.6 | 64.4 | 0.0 | 2.8 | 0.0 | 0.0 | 1.4 (*2) |
| | 1-10 | D10 | 31.4 | 1.6 | 63.9 | 0.0 | 2.8 | 0.3 | 0.0 | 0.0 |
| | 1-11 | D11 | 29.9 | 1.6 | 64.8 | 0.0 | 2.6 | 1.0 | 0.3 | 0.0 |
| | 1-12 | D12 | 8.7 | 0.4 | 21.5 | 68.3 | 0.8 | 0.3 | 0.1 | 0.0 |
| | 1-13 | D13 | 80.3 | 3.6 | 5.4 | 0.0 | 7.2 | 2.7 | 0.9 | 0.0 |
| | 1-14 | D14 | 31.3 | 1.8 | 62.9 | 0.0 | 2.7 | 1.0 | 0.3 | 0.0 |
| Comparative | 1-1 | DC1 | 31.6 | 0.0 | 64.3 | 0.0 | 2.7 | 1.0 | 0.3 | 0.0 |
| Examples | 1-2 | DC2 | 31.9 | 1.6 | 0.0 | 62.4 | 2.8 | 1.0 | 0.3 | 0.0 |

| | | | | | Metal fine particle dispersion | | |
| | | | | Mass ratio | Cumulant average particle size of metal fine particles (μm) | | Evaluation of |
| | | Mass ratio [hydroxyacetone/metal] | Mass ratio [PG/metal] | Mass ratio [monocarboxylic acid/metal] | [polymer (b)/ (polymer (b) + metal)] | Before storage | After storage at 80° C. for one week | storage stability Cumulant average particle size ratio |
|---|---|---|---|---|---|---|---|---|
| Examples | 1-1 | 0.054 | 2.0 | 0.041 | 0.08 | 0.025 | 0.025 | 1.00 |
| | 1-2 | 0.055 | 2.0 | 0.042 | 0.08 | 0.021 | 0.022 | 1.05 |
| | 1-3 | 0.006 | 2.0 | 0.047 | 0.08 | 0.022 | 0.030 | 1.36 |
| | 1-4 | 1.120 | 2.0 | 0.047 | 0.08 | 0.022 | 0.028 | 1.27 |
| | 1-5 | 0.051 | 0.016 | 0.042 | 0.08 | 0.024 | 0.033 | 1.38 |
| | 1-6 | 0.051 | 5.1 | 0.044 | 0.08 | 0.023 | 0.029 | 1.26 |
| | 1-7 | 0.049 | 1.9 | 0.000 | 0.08 | 0.021 | 0.022 | 1.05 |
| | 1-8 | 0.054 | 2.2 | 0.047 | 0.09 | 0.024 | 0.034 | 1.42 |
| | 1-9 | 0.054 | 2.2 | 0.047 | 0.09 | 0.025 | 0.027 | 1.08 |
| | 1-10 | 0.051 | 2.0 | 0.0096 | 0.08 | 0.024 | 0.026 | 1.08 |
| | 1-11 | 0.054 | 2.2 | 0.043 | 0.08 | 0.021 | 0.023 | 1.10 |
| | 1-12 | 0.046 | 2.5 | 0.046 | 0.08 | 0.022 | 0.025 | 1.14 |
| | 1-13 | 0.045 | 0.1 | 0.045 | 0.08 | 0.030 | 0.040 | 1.33 |
| | 1-14 | 0.058 | 2.0 | 0.042 | 0.08 | 0.032 | 0.037 | 1.16 |
| Comparative | 1-1 | 0.000 | 2.0 | 0.041 | 0.08 | 0.022 | 0.052 | 2.36 |
| Examples | 1-2 | 0.050 | 0.0 | 0.041 | 0.08 | 0.025 | 0.051 | 2.04 |

Note
(*1): Fumaric acid;
(*2): Propionic acid

From the results shown in Table 1, it was confirmed that the metal fine particle dispersions obtained in Examples 1-1 to 1-14 were excellent in storage stability even when stored at 80° C. for one week notwithstanding that the metal fine particles contained therein had a cumulant average particle size of not more than 0.1 μm, as compared to those metal fine particle dispersions obtained in Comparative Examples 1-1 and 1-2.

<Production of Inks and Preparation of Printed Materials, as Well as Evaluation Thereof>

(Production of Inks)

Example 2-1

The same procedure as in Example 1-1 was conducted to obtain the metal fine particle dispersion D1. The whole amount of the resulting metal fine particle dispersion D1 was charged into an eggplant-shaped flask, and while stirring the dispersion with a magnetic stirrer, ion-exchanged water was added to the flask to control a content of the metal in the resulting ink to 10%. Thereafter, the obtained mixture was subjected to filtration treatment using a 25 mL-capacity needleless syringe available from Terumo Corporation fitted with a 5 μm-pore size membrane filter "Minisart" (tradename) available from Sartorius Inc., thereby obtaining the ink. It was confirmed that the viscosity of the thus obtained ink was 5.4 mPa·s (32° C.), and the pH value of the ink was 8.3 (20° C.).

Examples 2-2 to 2-14 and Comparative Examples 2-1 and 2-2

The same procedure as in Example 2-1 was repeated except that the metal fine particle dispersion D1 was replaced with each of the metal fine particle dispersions D2 to D14, and DC1 and DC2 obtained in Examples 1-2 to 1-14 and Comparative Examples 1-1 and 1-2, respectively, thereby obtaining respective inks (metal content: 10%).

(Preparation of Printed Material for Evaluation of Glossiness by Ink-Jet Printing)

Using the respective inks obtained in the aforementioned Examples and Comparative Examples, printing operation was conducted by the method using the following printing conditions, and the metal film formed on a printing medium was evaluated for glossiness thereof by the following evaluation method. The results are shown in Table 2.

Under the environmental conditions of a temperature of 25±1° C. and a relative humidity of 30±5%, the respective inks were loaded into an ink-jet print evaluation apparatus available from Trytech Co., Ltd., equipped with an ink-jet print head "KJ4B-QA06NTB-STDV" (piezoelectric type; number of nozzles: 2,656) available from Kyocera Corporation.

The operating conditions of the print evaluation apparatus and the print head were set to a head applied voltage of 26 V, a head drive frequency of 20 kHz, an ejected ink droplet amount of 18 μL, a head temperature of 32° C., a resolution of 600 dpi, the number of ink shots for flushing before being ejected of 200 shots and a negative pressure of −4.0 kPa, and a printing medium was fixed on a transportation table under reduced pressure such that a longitudinal direction of the printing medium was aligned with a transportation direction thereof. A printing command was transmitted to the aforementioned print evaluation apparatus to eject and adhere the ink onto the printing medium at Duty 100%, and then the ink on the printing medium was heated and dried on a hot plate at 60° C. for 2 minutes to form a metal film on the printing medium, thereby obtaining printed materials 1 to 14, and C1 and C2 for evaluation of glossiness of the ink.

Meanwhile, as the printing medium, there was used a polyester film "LUMIRROR T60" (thickness: 75 μm) available from Toray Industries Inc.

[Evaluation of Glossiness of Metal Film]

The b* value of the printed material for evaluation of glossiness obtained above was measured using an integrating sphere spectrophotometer "CM-700d" available from Konica Minolta Inc., under an SCI mode (whole light mode). As the b* value became closer to 0, the metal film was more likely to exhibit inherent metallic luster, and it was therefore indicated that the metal film was more improved in glossiness. The results are shown in Table 2.

TABLE 2

| | | Metal fine particle dispersion | | Ink |
|---|---|---|---|---|
| | Kind | Metal concentration (% by mass) | | Evaluation of glossiness of metal film b* value of metal film |
| Examples | 2-1 D1 | 31.7 | | −0.3 |
| | 2-2 D2 | 31.0 | | −0.5 |
| | 2-3 D3 | 31.8 | | −14.0 |
| | 2-4 D4 | 23.4 | | −11.0 |
| | 2-5 D5 | 31.2 | | −9.0 |
| | 2-6 D6 | 15.8 | | −13.0 |
| | 2-7 D7 | 32.6 | | −15.0 |
| | 2-8 D8 | 29.9 | | −8.0 |
| | 2-9 D9 | 29.8 | | −12.0 |
| | 2-10 D10 | 31.4 | | −14.0 |
| | 2-11 D11 | 29.9 | | −1.1 |
| | 2-12 D12 | 8.7 | | −4.0 |
| | 2-13 D13 | 80.3 | | −2.0 |
| | 2-14 D14 | 31.3 | | −0.7 |
| Comparative Examples | 2-1 DC1 | 31.6 | | −26.0 |
| | 2-2 DC2 | 31.9 | | −21.0 |

From the results shown in Table 2, it was confirmed that the inks obtained in Examples 2-1 to 2-14 were capable of exhibiting inherent metallic luster, and were also capable of forming metal films that were excellent in glossiness, as compared to the inks obtained in Comparative Examples 2-1 and 2-2.

(Preparation of Printed Material for Evaluation of Conductivity by Ink-Jet Printing)

Using the ink obtained in Example 2-1, the same procedure as described in the aforementioned paragraph "Preparation of Printed Material for Evaluation of Glossiness" was repeated under the same printing conditions as used therein except that the printing medium was changed to a polyethylene naphthalate (PEN) film "TEONEX Q51-A4" (210 mm in length×297 mm in width; thickness: 25 μm) available from Teijin Film Solutions Ltd., thereby forming an ink coating film as a solid image on the printing medium. Thereafter, the ink coating film was heated under the conditions of a temperature of 190° C. and a pressure of 8 kPa for 1 hour using a vacuum dryer "AVO-200NB" available from AS ONE Corporation to form a metal film, thereby obtaining a printed material 1 for evaluation of conductivity.

[Evaluation of Conductivity]

Using the printed material for evaluation of conductivity obtained above, the volume resistivity of the metal film formed thereon was measured by the following method to evaluate conductivity of the metal film.

Using the printed material for evaluation of conductivity obtained above, an ASP probe was connected to a low-resistance resistivity meter "Loresta-GP MCP-T610" available from Mitsubishi Chemical Analytech Co., Ltd., and the resistance values of the metal film of the printed material were measured at 10 positions thereof by the 4-terminal 4-point probe method according to JIS K7194 "TESTING METHOD FOR RESISTIVITY OF CONDUCTIVE PLASTICS WITH A FOUR-POINT PROBE ARRAY", and the average value of the thus measured resistance values was defined as the volume resistivity of the metal film.

Incidentally, the thickness of the metal film used for measurement of the volume resistivity was measured by observing a section of the metal film cut by a stainless steel razor (76 razor for ordinary use; blade thickness: 76 μm) available from FEATHER Safety Razor Co., Ltd., using a scanning electron microscope (SEM) "S-4800" (device name) available from Hitachi Ltd., and the thus measured thickness of the metal film was input to the resistivity meter.

The printed material 1 for evaluation of conductivity had a volume resistivity of $1.6×10^5$ (Ω·cm), and therefore exhibited sufficient conductivity.

<Manufacture of RFID Tag>

(Production of Antenna for RFID Tag by Ink-Jet Printing)

Using the ink obtained in Example 2-1, the same procedure as described in the aforementioned paragraph "Preparation of Printed Material for Evaluation of Glossiness" was repeated under the same printing conditions as used therein except that the printing medium was replaced with the aforementioned PEN film (210 mm in length×297 mm in width; thickness: 25 μm), thereby forming an antenna pattern (outer contour size: 95 mm×8 mm) acting as an antenna for RFID tag in the UHF band. Thereafter, the antenna pattern was heated under the conditions of a temperature of 190° C. and a pressure of 8 kPa using the aforementioned vacuum dryer, thereby obtaining an antenna 1 for RFID tag.

(Surface Mounting of Communication Circuit)

A semiconductor chip for RFID in the UHF band "Alien-Higgs 3" available from Alien Technology Corporation was mounted on the antenna 1 for RFID tag obtained above using a conductive paste "TK Paste CR-2800" (tradename) available from KAKEN Tech Co., Ltd., thereby producing an RFID tag 1. Furthermore, 100 RFID tags 1 in total were produced in the same manner as described above.

[Evaluation of RFID in UHF Band]

Using a UHF band RFID reader/writer main body "DOTR-2100" available from Tohoku Systems Support Co., Ltd., and a software "RFID-BOX" available from Tohoku Systems Support Co., Ltd., RFID communication was conducted at a communication range of 20 cm to execute write-in and read-out of data. The 100 RFID tags 1 produced above were subjected to the aforementioned RFID communication test. As a result, it was confirmed that all of the 100 RFID tags 1 were communicable, and therefore the fraction defective of the RFID tags was 0%.

<Manufacture of MLCC>

(Preparation of Ceramic Slurry for Formation of Dielectric Layer)

A porcelain ball mill (outer diameter: 120 mm; capacity: 900 mL) available from Nitto Kagaku Co., Ltd., was charged with materials for formation of a dielectric layer including 100 parts of barium titanate (guaranteed grade) available from FUJIFILM Wako Pure Chemical Corporation, 7 parts of polyvinyl butyral "S-LEC BM-2" (tradename) available from Sekisui Chemical Co., Ltd., 3 parts of dioctyl phthalate (guaranteed grade) available from Tokyo Chemical Industry Co., Ltd., 30 parts of methyl ethyl ketone (guaranteed grade) available from FUJIFILM Wako Pure Chemical Corporation, 20 parts of ethanol (guaranteed grade) available from FUJIFILM Wako Pure Chemical Corporation and 20 parts of toluene (guaranteed grade) available from FUJIFILM Wako Pure Chemical Corporation together with 600 parts of zirconia beads "Model No.: YTZ-1" available from Nikkato Corporation, and the contents of the ball mill were mixed with each other at 200 rpm for 20 hours, thereby obtaining a ceramic slurry 1 for formation of a dielectric layer.

(Preparation of Multi-Layer Laminated Sheet by Ink-Jet Printing)

Using the ceramic slurry 1 for formation of a dielectric layer and the ink obtained in Example 2-1 as an ink for formation of an internal electrode layer, the same procedure as described in the aforementioned paragraph "Preparation of Printed Material for Evaluation of Glossiness" was repeated under the same printing conditions as used therein except that the printing medium was replaced with the aforementioned PEN film (210 mm in length×297 mm in width; thickness: 25 μm) to conduct printing so as to alternately laminate the dielectric layers and the internal electrode layers on the printing medium, followed by releasing the printing medium from the resulting laminate, thereby obtaining a multi-layer laminated sheet 1. The number of the layers in the multi-layer laminated sheet 1 was 256 in total as a sum of the dielectric layers and internal electrode layers laminated.

(Preparation of MLCC)

The thus obtained multi-layer laminated sheet 1 was placed in a small-scale box furnace "Model No.: KBF333N1" available from Koyo Thermo Systems Co., Ltd., and subjected to heat treatment at 190° C. for 1 minute to dry the sheet and remove the solvent therefrom.

Next, the thus heat-treated multi-layer laminated sheet 1 was cut along a predetermined cutting line by dicing and formed into a chip shape (size: 32 mm×16 mm). The thus cut chips were heated in the small-scale box furnace in an N$_2$ atmosphere at 350° C. for 3 hours to burn and remove organic substances such as polymers, etc., therefrom, and then baked in the small-scale box furnace in a reducing gas atmosphere at 900° C. for 2 hours, thereby obtaining a capacitor baked body 1 as a capacitor main body.

Then, a glass frit-containing silver paste "Model No.: TDPAG-TS1002-80" available from AS ONE Corporation was applied to both end surfaces of the capacitor baked body 1, and the resulting product was further burned in the small-scale box furnace in an N$_2$ atmosphere at 800° C. to form external electrodes, thereby obtaining MLCC 1 in which the external electrodes and the internal electrode layers were electrically connected to each other.

[Observation and Evaluation of MLCC]

The section of the MLCC1 was observed by the aforementioned SEM to evaluate the condition of lamination of the dielectric layers and the internal electrode layers. The thickness of each of the dielectric layers and the internal electrode layers was 0.6 μm, and there were no variation between the thicknesses of the respective layers when observed at 50 positions thereof, so that it was confirmed that the resulting MLCC had a high thickness accuracy.

INDUSTRIAL APPLICABILITY

According to the present invention, it is possible to obtain a metal fine particle dispersion that is excellent in storage stability under high-temperature conditions. In addition, according to the present invention, by using an ink containing the metal fine particle dispersion, it is possible to obtain a printed material on which a metal film that is excellent in metallic luster and is capable of exhibiting a high conductivity is formed. For this reason, the metal fine particle dispersion and the ink containing the metal fine particle dispersion can be suitably used in various application fields.

The invention claimed is:

1. A dispersion of metal fine particles, comprising:
hydroxyacetone;
propylene glycol; and
a monocarboxylic acid which consists of both acetic acid and formic acid,
wherein a cumulant average particle size of the metal fine particles is not less than 0.01 μm and not more than 0.1 μm,
wherein a mass ratio of the hydroxyacetone to a metal of the metal fine particles [hydroxyacetone/metal] is not less than 0.045 and not more than 0.058,
wherein a mass ratio of the propylene glycol to a metal of the metal fine particles [propylene glycol/metal] is not less than 2.0 and not more than 2.2, and
wherein a mass ratio of the monocarboxylic acid to the metal of the metal fine particles [monocarboxylic acid/metal] is not less than 0.041 and not more than 0.047.

2. The dispersion of metal fine particles according to claim 1, wherein the metal fine particles are dispersed with a polymer (b), and the polymer (b) comprises a carboxy group on a side chain thereof.

3. The dispersion of metal fine particles according to claim 1, wherein a concentration of a metal of the metal fine particles in the dispersion is not less than 2% by mass and not more than 85% by mass.

4. The dispersion of metal fine particles according to claim 1, wherein a metal constituting the metal fine particles is at least one metal selected from the group consisting of gold, silver, and copper.

5. An ink, comprising the dispersion of metal fine particle according to claim 1.

6. A method for producing a printed material, the method comprising applying the ink according to claim 5 onto a printing medium to produce the printed material on which a metal film is formed.

7. The method for producing a printed material according to claim 6, wherein a method of applying the ink onto the printing medium is an ink-jet printing method.

8. An antenna for RFID tag, which is formed from the ink according to claim 5.

9. An RFID tag, comprising the antenna for RFID tag according to claim 8.

10. A multi-layer ceramic capacitor, comprising an internal electrode layer that is produced from the ink according to claim 5.

11. The dispersion of metal fine particles according to claim 1, wherein the metal fine particles are dispersed with a polymer (b), and wherein the polymer (b) is a nonionic polymer, and the nonionic polymer is a polymer having a structure derived from vinyl pyrrolidone.

12. The dispersion of metal fine particles according to claim 1, further comprising a (poly)carboxylic acid having not less than 2 and not more than 24 carbon atoms.

13. The dispersion of metal fine particles according to claim 2, wherein a mass ratio of the polymer (b) to a sum of the polymer (b) and the metal of the metal fine particles [polymer (b)/(polymer (b)+metal)] is not less than 0.01 and not more than 0.3.

\* \* \* \* \*